(12) United States Patent  
Park et al.

(10) Patent No.: US 7,305,160 B2
(45) Date of Patent: Dec. 4, 2007

(54) TUNABLE WAVELENGTH OPTICAL TRANSMISSION MODULE

(75) Inventors: Mahn Yong Park, Daejeon (KR); Byoung Whi Kim, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 0 days.

(21) Appl. No.: 11/120,751

(22) Filed: May 2, 2005

(65) Prior Publication Data

US 2006/0078257 A1    Apr. 13, 2006

(30) Foreign Application Priority Data

Oct. 13, 2004  (KR)  .................. 10-2004-0081831

(51) Int. Cl.
   G02B 6/28      (2006.01)
   G02B 6/34      (2006.01)
(52) U.S. Cl. ............................. 385/37; 385/16; 385/24
(58) Field of Classification Search .................. 385/10, 385/37, 40
   See application file for complete search history.

(56) References Cited

U.S. PATENT DOCUMENTS

| | | | |
|---|---|---|---|
| 6,560,386 B2* | 5/2003 | Eldada et al. ................. | 385/37 |
| 6,647,032 B1 | 11/2003 | Lee et al. | |
| 6,738,543 B1* | 5/2004 | Beeson et al. ................. | 385/27 |
| 6,768,839 B2 | 7/2004 | Blomquist et al. | |
| 6,850,665 B2* | 2/2005 | Grubsky et al. .............. | 385/28 |
| 6,882,776 B2* | 4/2005 | Ovadia et al. ................. | 385/37 |
| 2002/0118711 A1 | 8/2002 | Jacquet | |
| 2003/0161570 A1* | 8/2003 | Paniccia ....................... | 385/14 |
| 2004/0105480 A1 | 6/2004 | Sidorin et al. | |
| 2005/0117843 A1* | 6/2005 | Catchmark et al. ........... | 385/37 |
| 2005/0180683 A1* | 8/2005 | Luther-Davies .............. | 385/16 |
| 2005/0232543 A1* | 10/2005 | Tsai et al. ...................... | 385/37 |

FOREIGN PATENT DOCUMENTS

KR    1020030048683 A    6/2003
KR    10-2004-0029720    4/2004

* cited by examiner

*Primary Examiner*—Michelle R. Connelly-Cushwa
(74) *Attorney, Agent, or Firm*—Blakely, Sokoloff, Taylor & Zafman

(57) ABSTRACT

Disclosed herein is a tunable wavelength optical transmission module, the wavelength of which can be tuned over the wide wavelength region of a C band and which can be implemented at a low price and, thus, can be applied to an optical network terminal. Bragg gratings having different grating periods are arranged in parallel or series and the temperatures of Bragg grating regions are then controlled, so that the wavelength of an optical signal can be tuned over a wide wavelength range through the small variation in temperature.

16 Claims, 24 Drawing Sheets

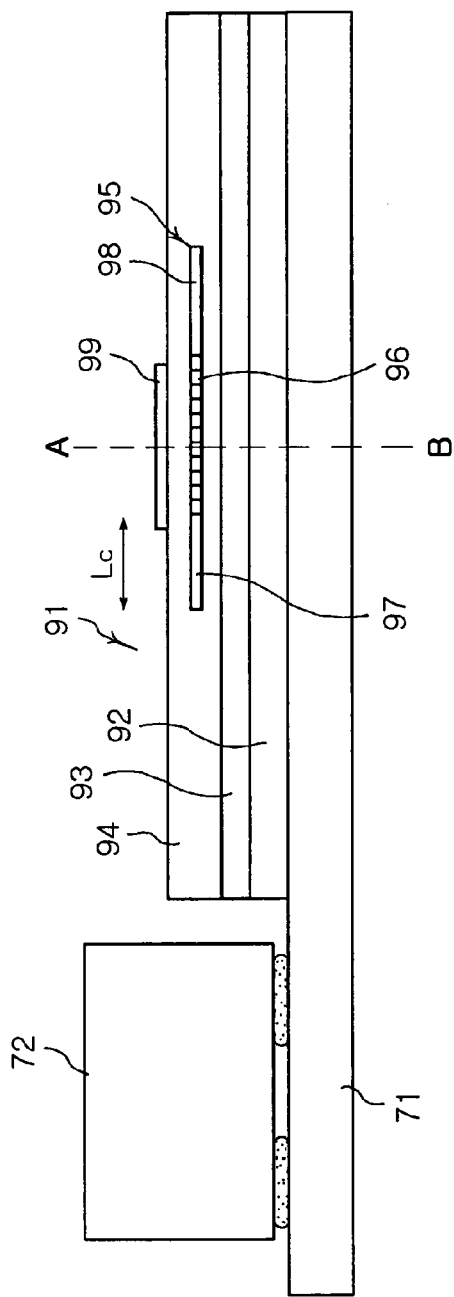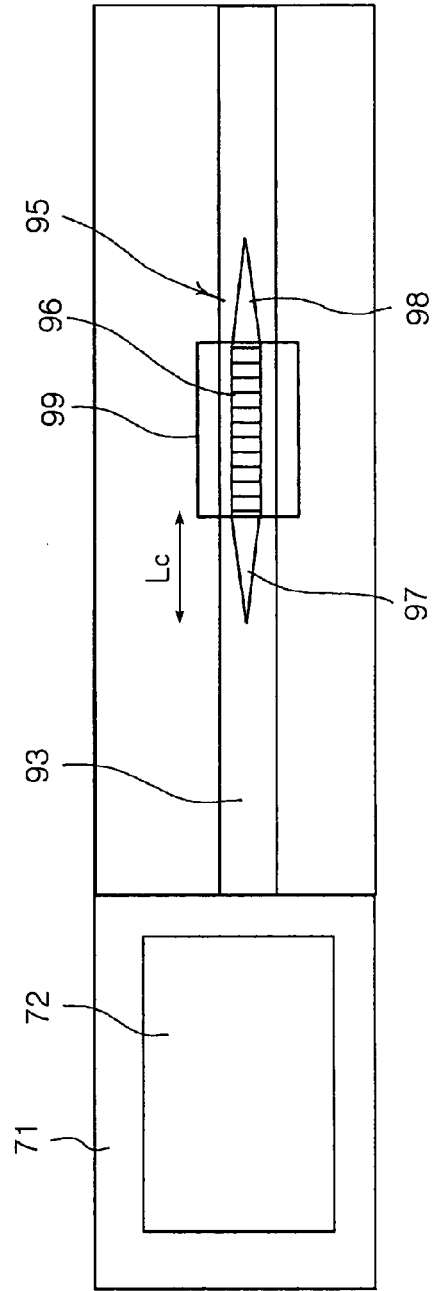
FIG. 17a
FIG. 17b

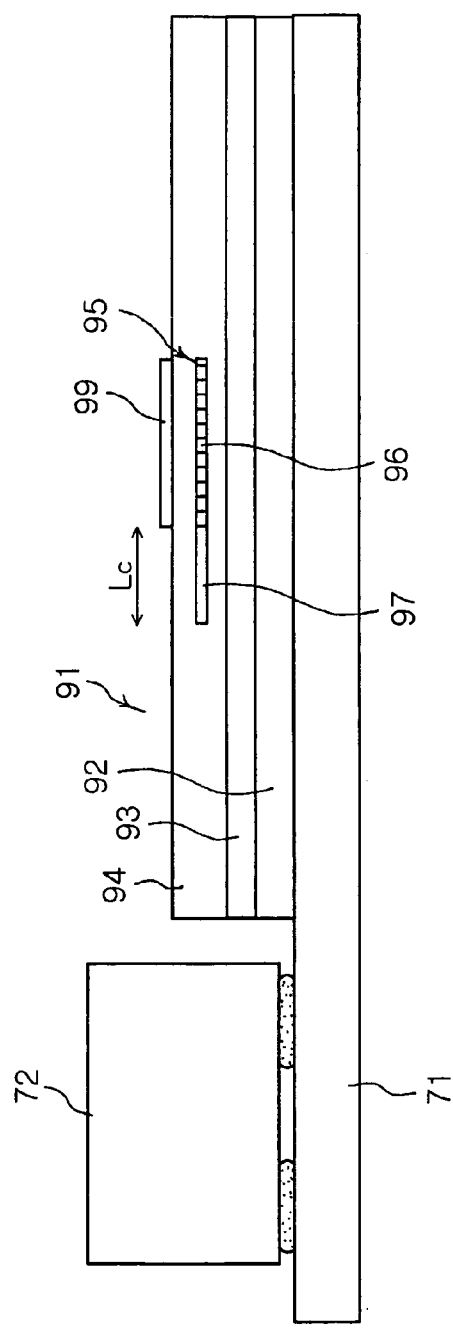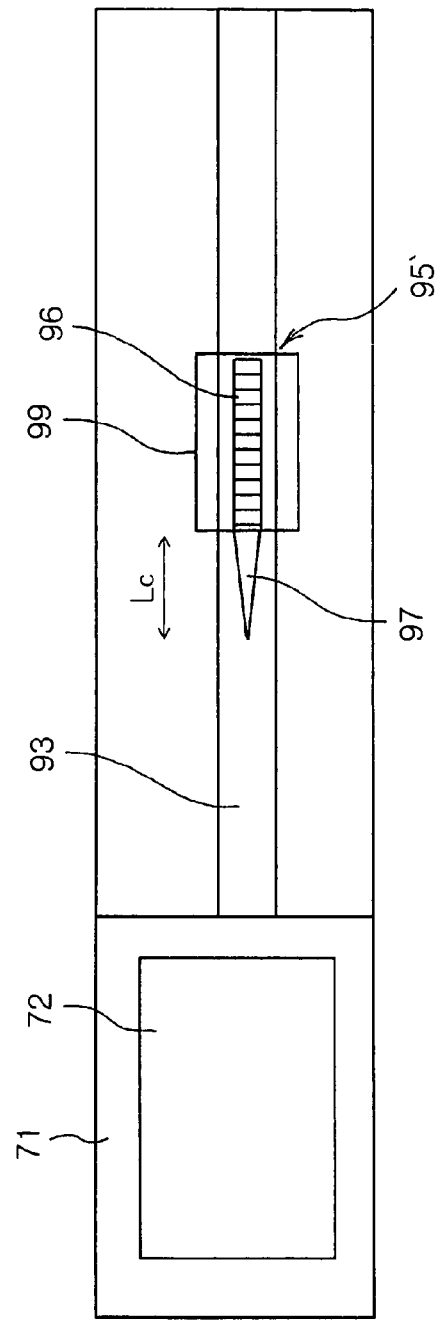

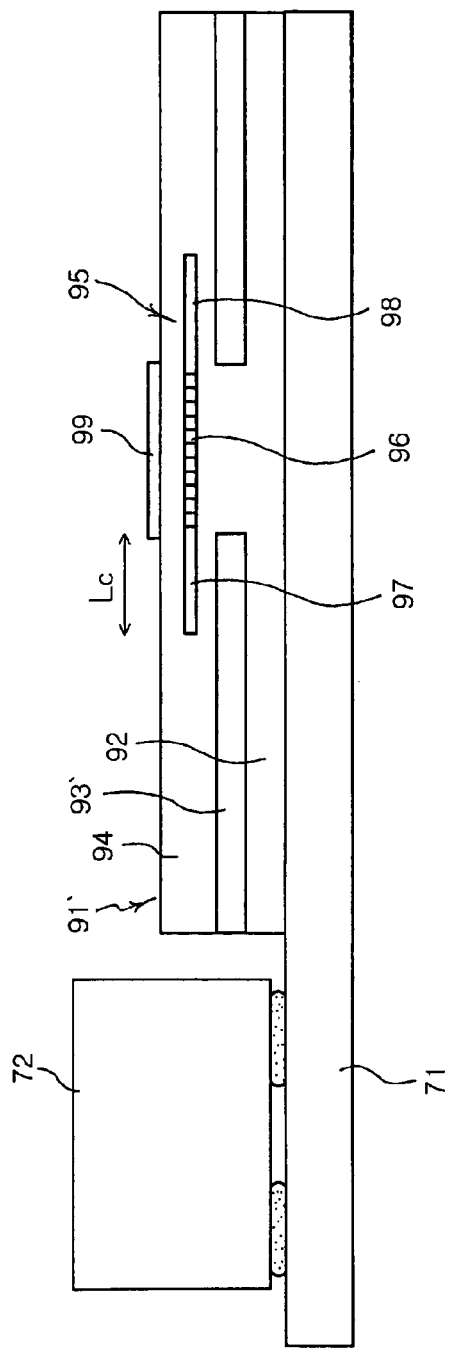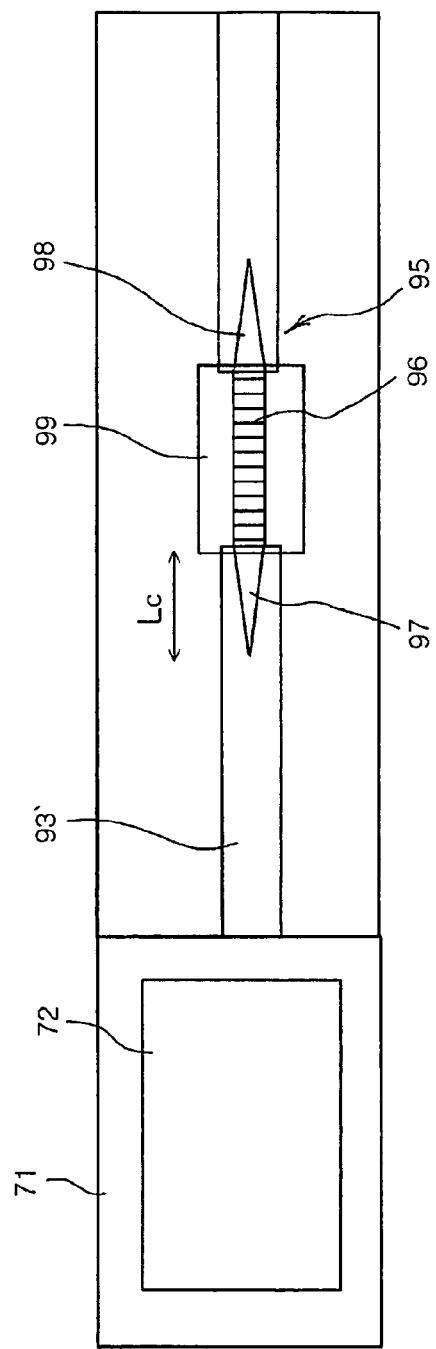

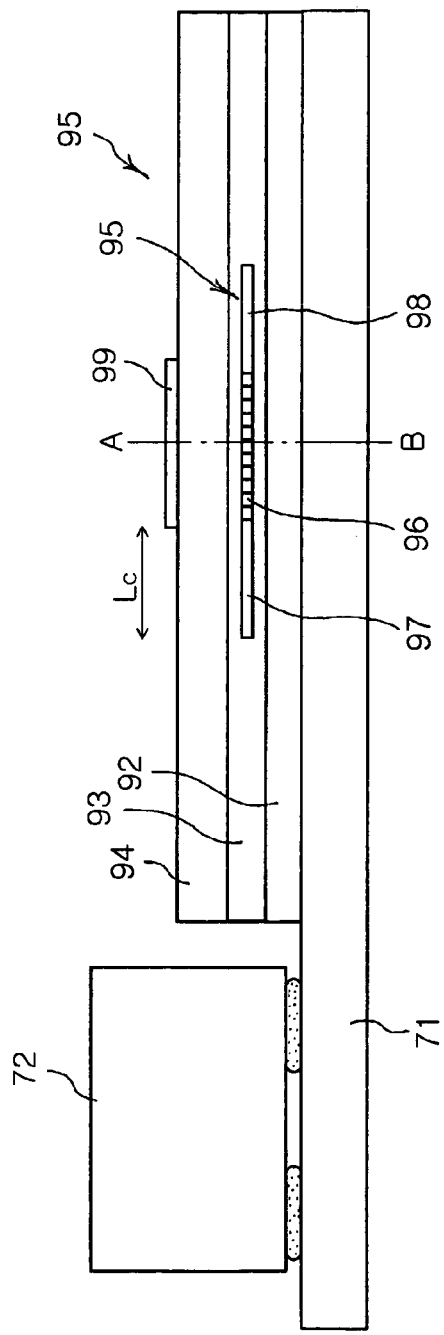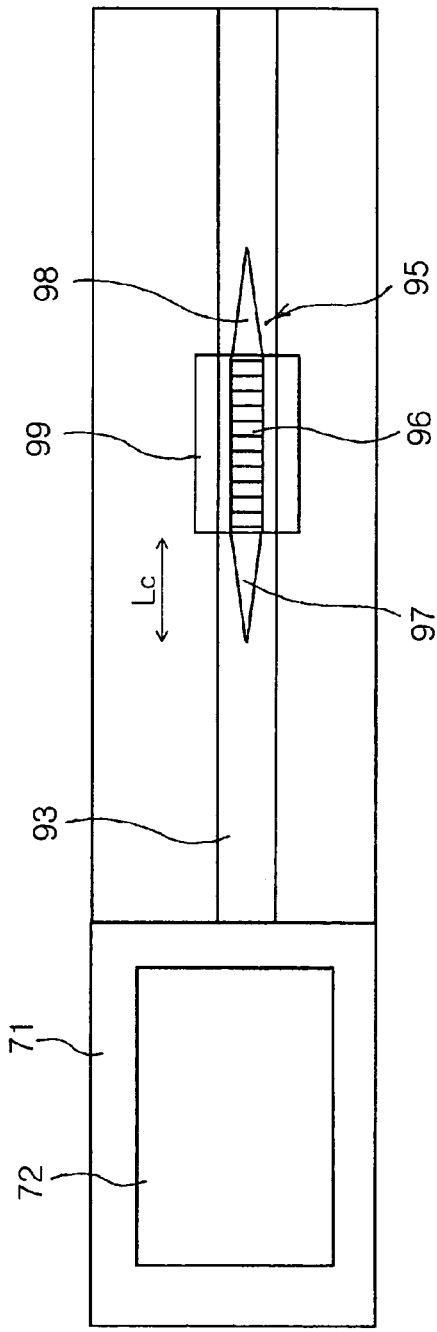
FIG. 21a
FIG. 21b

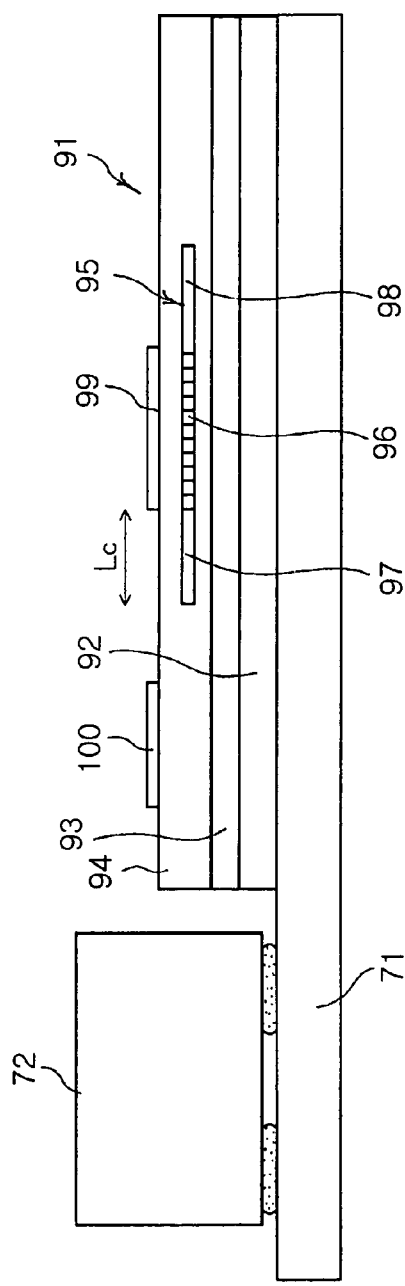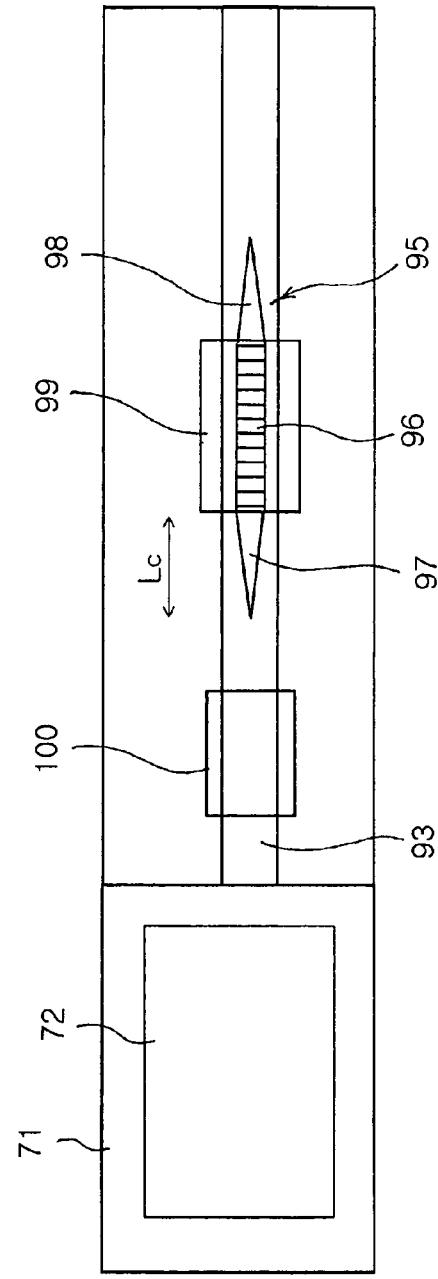
FIG. 23a
FIG. 23b

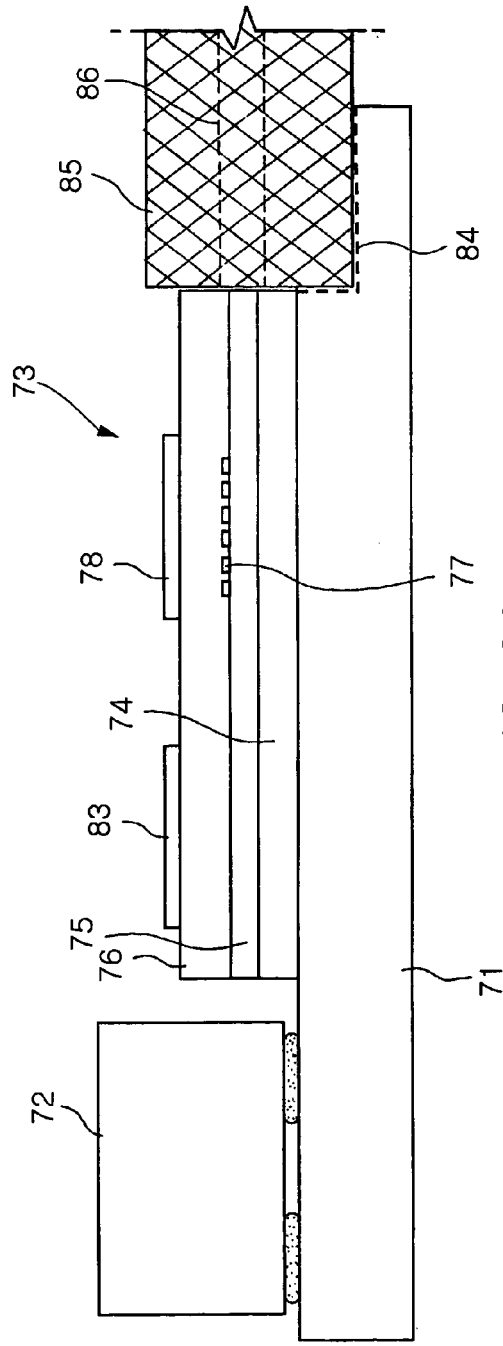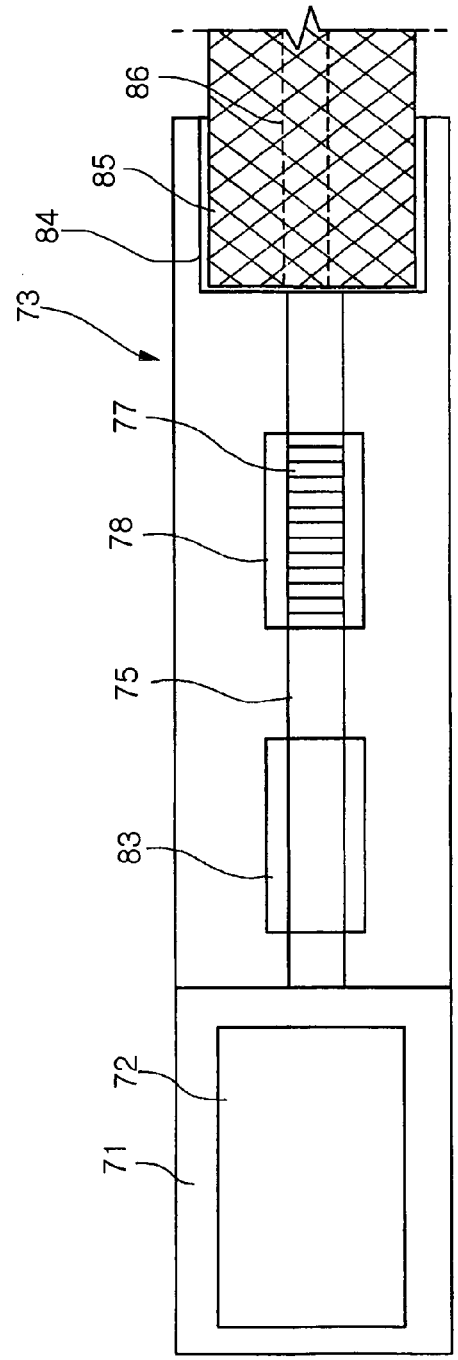
FIG. 24a
FIG. 24b

TUNABLE WAVELENGTH OPTICAL TRANSMISSION MODULE

RELATED APPLICATIONS

The present application is based on, and claims priority from, Korean Application Number 2004-81831, filed Oct. 13, 2004, the disclosure of which is hereby incorporated by reference herein in its entirety.

BACKGROUND OF THE INVENTION

1. Field of the Invention

The present invention relates generally to a tunable wavelength optical transmission module that is used in the optical network terminal of a wavelength division multiplexing-passive optical network and, more particularly, to a tunable wavelength optical transmission module the wavelength of which can be tuned over a wide wavelength region and which can be implemented at a low price.

2. Description of the Related Art

Recently, with the spread of Digital Groove Service, it is expected that a bandwidth of approximately 100 Mbps per subscriber is required. Accordingly, in place of existing communication methods that cannot provide a bandwidth of 50 Mbps or broader, such as a Digital Subscriber Line (DSL) method and a cable method, Fiber To The Home (FTTH) that can provide a bandwidth of 100 Mbps was proposed. FTTH refers to a subscriber network in which an optical fiber is installed up to the house of each subscriber, and a telephone signal, a facsimile signal, data, a television image, etc. can be transmitted through a single optical fiber. In order to implement such FTTH, an increasing number of subscribers must be accommodated without significantly increasing the scale of installation of the optical fiber and the cost of connecting optical fibers up to the subscribers must be low.

A Wavelength Division Multiplexing-Passive Optical Network (hereinafter referred to as a "WDM-PON") can be cited as an example of an optical subscriber network that implements FTTH satisfying the conditions. Since the WDM-PON transmits a plurality of multiplexed optical wavelengths over a single strand of optical fiber, subscribers identical in number to the number of optical wavelengths can be accommodated in a single optical line. As a result, the cost of lines and the cost of centralized management at a headend can be reduced. Furthermore, since the subscriber traffic is separated by allocating the optical channels of different wavelengths to the respective subscribers, it is advantageous from the aspects of security and protocol transparency.

The tunable wavelength optical source of an Optical Network Terminal (hereinafter referred to as an "ONT") that is installed on a subscriber side can be cited as the component of the WDM-PON that most affects the characteristics and cost of the WDM-PON.

An existing tunable wavelength optical source, for example, may be implemented in a single chip by integrating a Semiconductor Optical Amplifier (SOA) and an Electro-Absorption modulator (EA) on an InP substrate. The existing tunable wavelength optical source has a small size because it is formed by integrating devices having different functions on a single substrate. However, the existing tunable wavelength optical source is disadvantageous in that the yield thereof, which determines the price thereof, is very low, and the manufacturing cost thereof is high because an expensive 40-pin butterfly type package must be used due to the necessity for the control of many parts to obtain a desired wavelength.

Another example is a tunable wavelength Laser Diode (LD) that is fabricated by arranging individual elements in an active alignment manner, not by an integration scheme. However, this scheme is problematic in that the price of the package increases due to the active alignment of the individual elements and mechanical and thermal stability is degraded due to the non-integration of the individual elements.

Furthermore, the specifications of the tunable wavelength LD that is required in the operation of a long-distance communication network require an LD that is basically formed by combining the tunable wavelength characteristics of a C-band with the optical/mechanical/thermal characteristics of a DFB-LD device, so that the existing tunable wavelength LD is not suitable for an optical subscriber network that requires a tunable wavelength LD that can be manufactured at low cost through mass production.

As a result, there are demands for an optical transmission module that is suitable for the ONT of an optical subscriber network and can be manufactured at a low price through mass production.

SUMMARY OF THE INVENTION

Accordingly, the present invention has been made keeping in mind the above problems occurring in the prior art, and an object of the present invention is to provide a tunable wavelength optical transmission module the wavelength of which can be tuned over the wide wavelength region of a C band and which can be implemented at a low price.

Another object of the present invention is to provide a tunable wavelength optical transmission module that can solve an inventory problem because the wavelength thereof can be set at the time of installation, not at the time of manufacture.

In order to accomplish the above objects, a first embodiment of the present invention provides a tunable wavelength optical transmission module, including a laser diode for generating light and outputting the light in a predetermined direction; a first optical switch for selectively providing an optical signal output from the laser diode to a plurality of optical paths; a plurality of planar-type waveguides coupled to the plurality of the output paths of the first optical switch, respectively; a plurality of Bragg gratings having different grating periods to tune a wavelength of the optical signal that passes through a corresponding planar-type waveguide, the Bragg gratings being formed on the planar-type waveguides, respectively, to be connected in parallel to each other; a plurality of heaters respectively formed on the plurality of the planar-type waveguides at locations opposite to those of the Bragg gratings to control reflectance and reflection bands of the Bragg gratings using a thermooptic effect, respectively; and a second optical switch for selecting and outputting one of optical signals wavelengths of which are tuned through the plurality of the planar-type waveguides.

In the tunable wavelength optical transmission module according to the first embodiment of the present invention, the first and second optical switches are preferably optical waveguide type switches, so that the tunable wavelength optical transmission module can be implemented on a single PLC platform.

In order to accomplish the above objects, a second embodiment of the present invention provides a tunable wavelength optical transmission module, including a laser diode for generating light and outputting the light in a predetermined direction; a planar-type waveguide on which the light output from the laser diode is incident; a plurality of Bragg gratings having different grating periods to tune a wavelength of the optical signal that passes through a corresponding planar-type waveguide, the Bragg gratings being formed on the planar-type waveguides, respectively, to be connected in series to each other; and a plurality of heaters respectively formed on the plurality of the planar-type waveguides above the Bragg gratings to control reflectance and reflection bands of the Bragg gratings using a thermooptic effect, respectively.

In the tunable wavelength optical transmission module, the Bragg gratings have thermooptic coefficients and refractive indices that satisfy the following equation, $$\left|\frac{dn_{BG}}{dT}\right| > \left|\frac{dn_{core,cladding}}{dT}\right|, n_{BG} > n_{cladding}, \text{ or}$$

$$\left|\frac{dn_{BG}}{dT}\right| < \left|\frac{dn_{core,cladding}}{dT}\right|, n_{BG} < n_{cladding}$$

where $$\frac{dn_{BG}}{dT}$$

is the thermooptic coefficient of the Bragg gratings, $$\frac{dn_{core,cladding}}{dT}$$

is the thermooptic coefficient of the core layer and cladding layer of the waveguide, $n_{BG}$ is the refractive index of the Bragg gratings, and $n_{cladding}$ is the refractive index of the cladding layer of the waveguide.

In order to accomplish the above objects, a second embodiment of the present invention provides a tunable wavelength optical transmission module, including a laser diode for generating light and outputting the light in a predetermined direction; a first waveguide on which the light output from the laser diode is incident and which is made of $SiO_2$; a second waveguide made of SiN and formed within the first waveguide; a plurality of Bragg gratings having different grating periods to tune wavelengths of optical signals, the Bragg grating being formed on the second waveguide to be connected in series to each other; and a plurality of heaters formed on the first waveguide at locations opposite to those of the Bragg gratings, respectively, to turn operational wavelengths of the Bragg gratings using a thermooptic effect.

In the tunable wavelength optical transmission module, one or two coupling regions are preferably formed at both ends thereof or at a front end thereof on which the light is incident from the first waveguide, thus improving optical coupling efficiency.

In the tunable wavelength optical transmission module, a predetermined portion of the first waveguide located below the second waveguide is preferably removed to prevent transmission of the light through the first waveguide, thus minimizing the interference caused by the light that is transmitted through the first waveguide.

In the tunable wavelength optical transmission module, the first waveguide is a channel waveguide that comprises a lower cladding layer, a core layer formed on the lower cladding layer to have a predetermined width, and an upper cladding layer adapted to cover a top of the core layer, and the second waveguide is located within the upper cladding layer at a predetermined height above the core layer of the first waveguide or in the core layer of the first waveguide.

The tunable wavelength optical transmission module may further include a phase adjustment means for finely controlling the wavelength by changing the mode condition of the waveguide using a thermooptic effect.

In the tunable wavelength optical transmission module, a V-groove is formed at the end of the waveguide, from which the light is output, to couple the module to an optical fiber, thus implementing manual alignment and, therefore, achieving cost saving.

BRIEF DESCRIPTION OF THE DRAWINGS

The above and other objects, features and advantages of the present invention will be more clearly understood from the following detailed description taken in conjunction with the accompanying drawings, in which:

FIGS. 17a and 17b are sectional and top views showing the basic structure of a tunable wavelength optical transmission module according to a third embodiment of the present invention;

FIGS. 19a and 19b are sectional and top views showing a variation of the tunable wavelength optical transmission module shown in FIGS. 17a and 17b;

FIGS. 20a and 20b are sectional and top views showing another variation of the tunable wavelength optical transmission module shown in FIGS. 17a and 17b;

FIGS. 21a and 21b are sectional and top views of another structure of the tunable wavelength optical transmission module according to the third embodiment of the present invention, respectively;

FIGS. 23a and 23b are sectional and top views of a tunable wavelength optical transmission module having a phase adjustment means according to the third embodiment of the present invention; and FIGS. 24a and 24b are views showing the structure in which a tunable wavelength optical transmission module and an optical fiber are coupled to each other according to the present invention.

DESCRIPTION OF THE PREFERRED EMBODIMENTS

Figure 1:
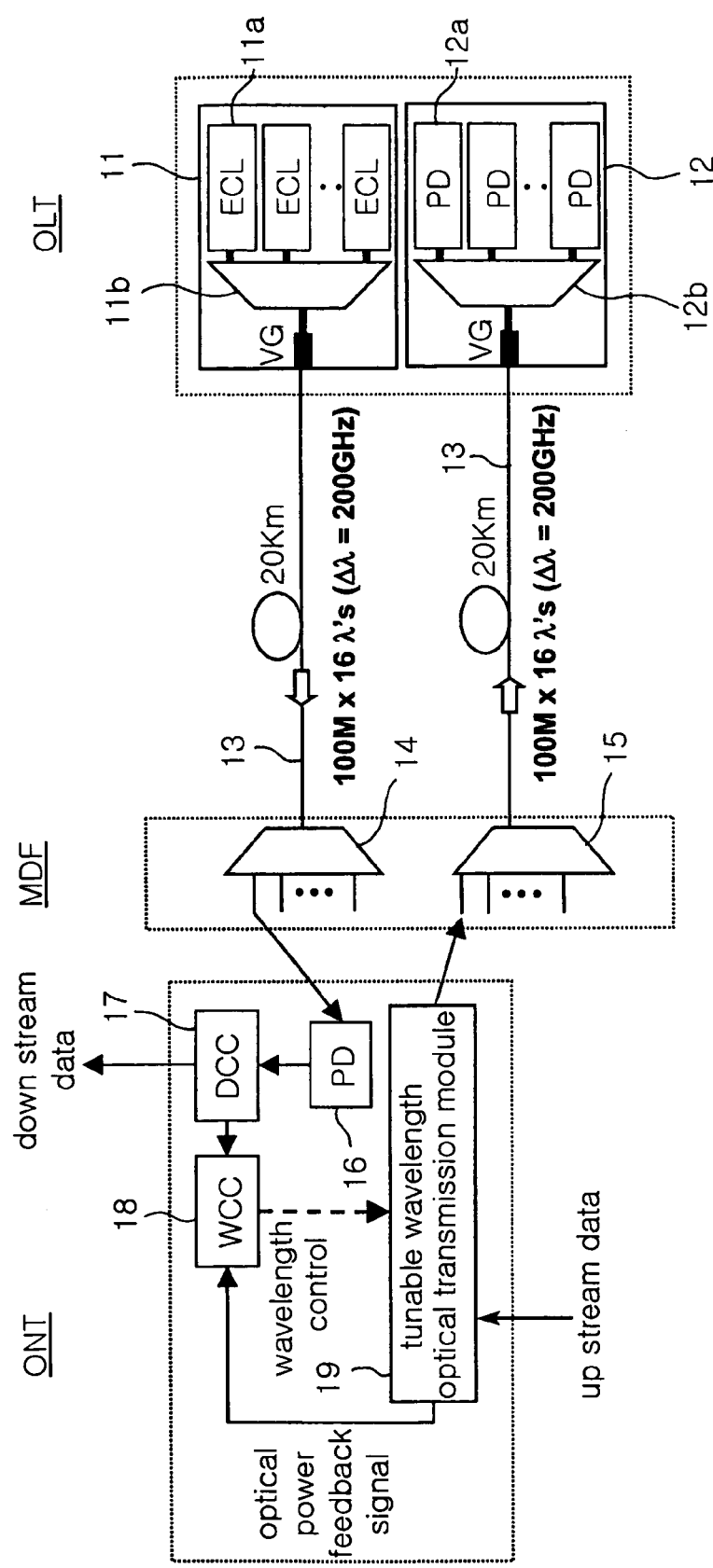
FIG. 1 is a diagram showing the typical construction of a WDM-PON.

Reference now should be made to the drawings, in which the same reference numerals are used throughout the different drawings to designate the same or similar components.

FIG. 1 shows the typical construction of an optical subscriber network to which a tunable wavelength optical transmission module of the present invention is applied.

The optical subscriber network has the structure of a PON in which an active device is not included between a central office and subscriber terminals. Referring to FIG. 1, an Optical Line Terminal (hereinafter referred to as an "OLT") is provided on a central office side, and an Optical Network Terminal (hereinafter referred to as an "ONT") is provided in the subscriber terminal.

The optical transmission module 11 of the OLT may be formed by integrating an External Cavity Laser (hereinafter referred to as an "ECL") array 11a for outputting optical signals of different wavelengths and a multiplexer 11b for wavelength-multiplexing the optical signals from the ECL array 11a and outputting the multiplexed signals to an optical fiber 13 on a single substrate. In the same manner, the optical receiving module 12 of the OLT may be formed by integrating a demultiplexer 12b, which is adapted to demultiplex an upstream signal from the optical fiber 13 according to wavelengths and to distribute optical signals of a plurality of wavelengths, and a photo diode (hereinafter referred to as a "PD") array 12a, which is provided on each of the output terminals of the demultiplexer 12b to receive an optical signal of each wavelength and to convert the optical signal into an electrical signal, on a single substrate into a single chip.

The wavelength-multiplexed optical signal output from the optical transmission module 11 of the OLT is separated according to wavelengths in the demultiplexer 14 of a Main Distributed Frame (hereinafter referred to as an "MDF") near subscribers' places of residence, and separated optical signals are then distributed to the ONTs of individual subscribers.

The ONT of each subscriber is provided with a PD 16 and thus converts an optical signal of a predetermined wavelength provided by the demultiplexer 14 into an electrical signal, and the electrical signal is input to and processed by a Data Control Center (hereinafter referred to as a "DCC") 17.

The tunable wavelength optical transmission module 19 of the ONT converts upstream data into an optical signal of a predetermined wavelength and transmits the optical signal. Optical signals of different wavelengths transmitted by the ONTs of the plurality of subscribers are wavelength-multiplexed by the multiplexer 15 of the MDF and a multiplexed optical signal is then transmitted to the optical receiving module 12 of the OLT through the optical fiber 13.

The tunable wavelength optical transmission module 19 can be implemented using the tunable wavelength optical transmission module of the present invention, which will be described below. The tunable wavelength optical transmission module of the present invention is advantageous in that it can be implemented at a low price, and the wavelength thereof can be tuned over the entire region of a C band and can be tuned by a user's manipulation at the time of installation or according to control information transmitted from the OLT.

Accordingly, in the case where the tunable wavelength optical transmission module of the present invention is applied, when the OLT sends predetermined wavelength control information, along with downstream data, according to the analysis of received optical output and wavelength, the DCC 17 separates general data and wavelength control information from the received signal and then sends the separated wavelength control information to a Wavelength Control Center (hereinafter referred to as an "WCC") 18, and the WCC 18 compares the received wavelength control information and a feedback optical signal received from the optical transmission module 19 and then tunes the wavelength of the tunable wavelength optical transmission module 19.

The tunable wavelength optical transmission module of the present invention is constructed so that the wavelength thereof is tuned according to a thermooptic effect.

Figure 2:
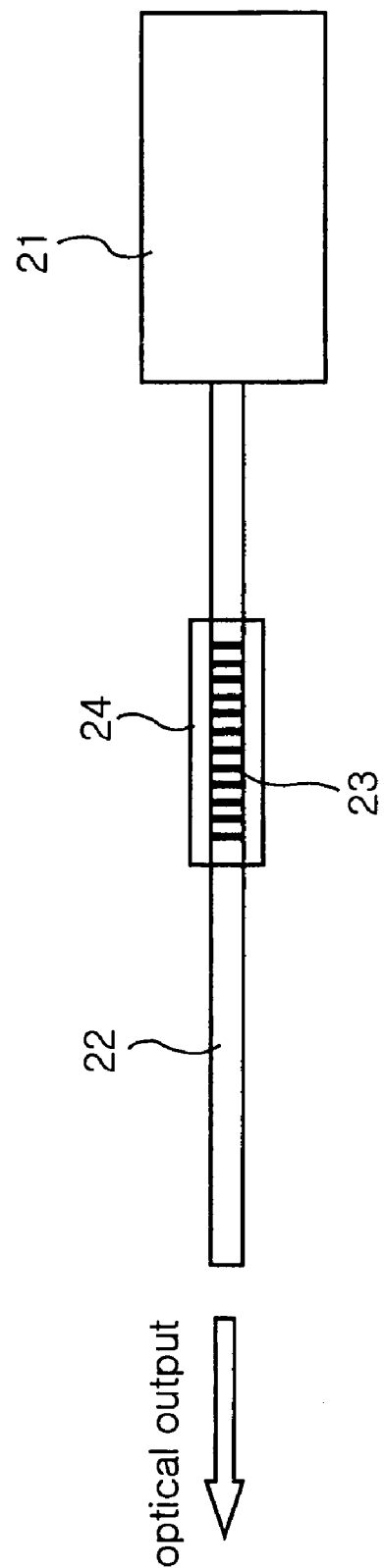
FIG. 2 is a diagram showing the basic structure of an optical transmission module, which illustrates the principle of wavelength tuning according to the present invention.

As shown in FIG. 2, generally, in a tunable wavelength structure based on the thermooptic effect, a Bragg grating 23 having a predetermined grating period is formed on a waveguide 22 along which an optical signal generated from a light source 21 is transmitted and heat is locally applied to the Bragg grating 23 using a heater 24, so that the refractive index of the Bragg grating 23 is changed and, thus, the center wavelength of the reflection band of the Bragg grating 11 is changed, thus tuning a signal wavelength.

Figure 3:
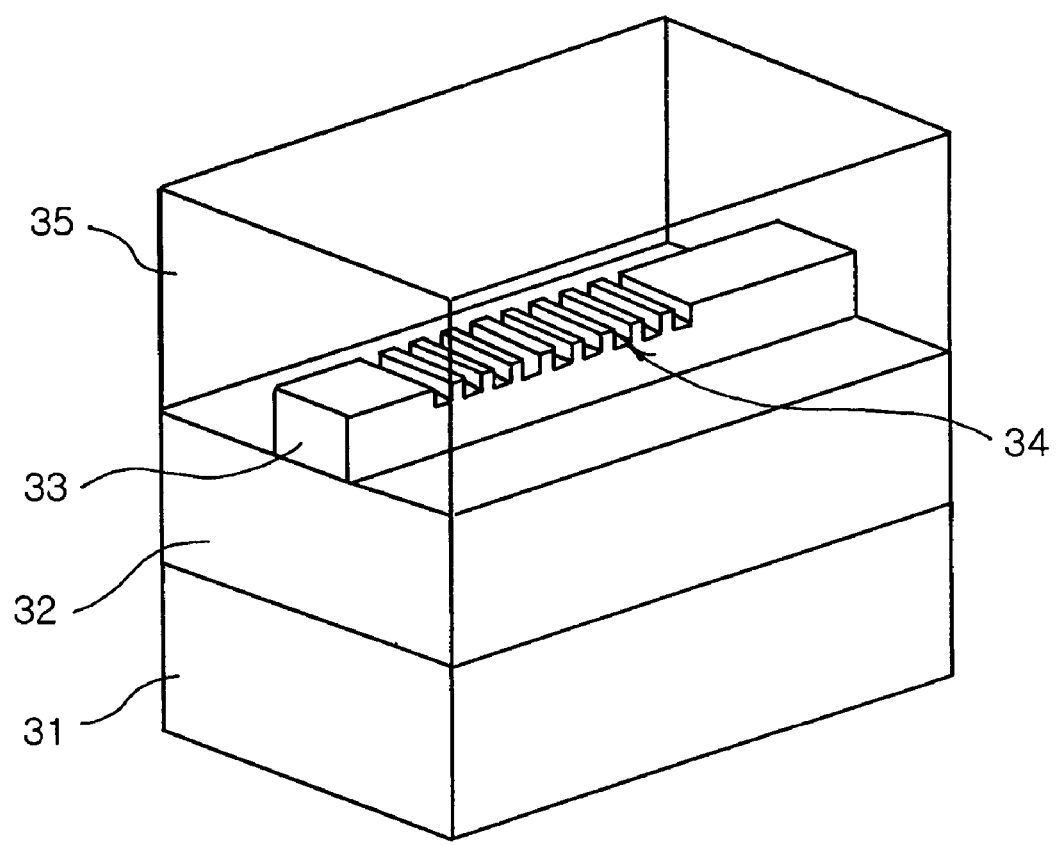
FIG. 3 is a block diagram showing the structure of a Bragg grating.

FIG. 3 shows the basic structure of a Bragg grating 34 that is used in the tunable wavelength optical transmission module using the thermooptic effect in accordance with the present invention. Referring to FIG. 3, the Bragg grating 34 is formed on the core layer 33 of a channel waveguide that is composed of a lower cladding layer 32, a core layer 33 and an upper cladding layer 35, and converts the line width of the core layer 33 at predetermined periods.

In that case, the waveguide in which the Bragg grating 34 is formed is made of a polymer material.

Figure 4:
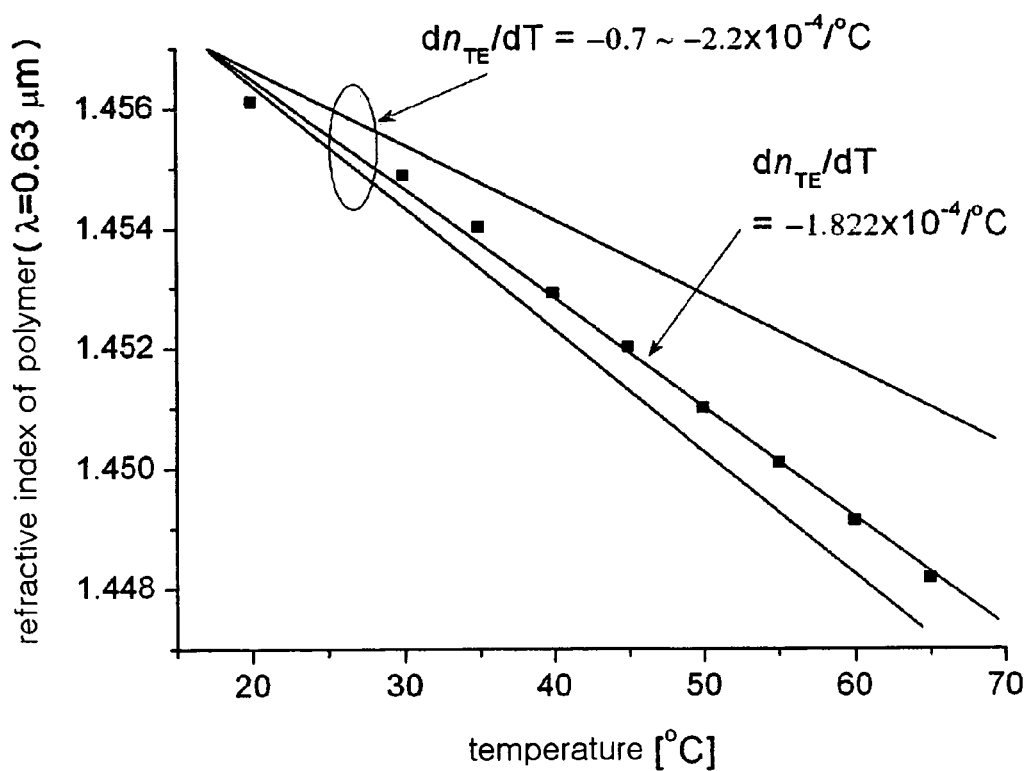
FIG. 4 is a graph showing the variation in the refractive index of a polymer material with the variation in temperature.

FIG. 4 is a graph showing the variation in the refractive index of a polymer material with the variation in temperature. The polymer material has a negative thermooptic coefficient value in which a refractive index decreases as a temperature increases. In the graph of FIG. 4, dots indicate refractive indices measured at 5° C. intervals. As the result of the calculation of the variation in the refractive index with the variation in temperature, the thermooptic coefficient was measured as about $-1.82 \times 10^{-4}$/K. The value of the thermooptic coefficient can vary with the composition of the polymer material, and usually falls within a range of $-0.7 \times 10^{-4}$/K to $-2.2 \times 10^{-4}$/K.

If the upper and lower cladding layers 35 and 32 and core layer 33 of the waveguide shown in FIG. 3 are made of the above-described polymer material and the Bragg grating 34 is formed on the core layer 33, the range of wavelengths that can be tuned by the variation in temperature in the Bragg grating 34 can be expressed as the following equation, $$\Delta \lambda_{tuning} = \frac{\lambda}{n} \frac{dn}{dT} \Delta T \quad (1)$$

In this equation, $$\frac{dn}{dT}$$

is the thermooptic coefficient of a corresponding material, $\Delta T$ is the temperature value of the Bragg grating 34, and $\Delta$ and n are the center wavelength and refractive index of the Bragg grating 34, respectively.

For example, if it is assumed that $$\frac{dn}{dT} = -1.5 \times 10^{-4} / K$$

and a temperature increase value $\Delta T$ is about 100° C., the range of wavelengths $\Delta \lambda$ is about 16 nm, which is not sufficient to tune the entire region of the C band. If the temperature increase value $\Delta T$ increases to about 200° C., the range of wavelengths $\Delta \lambda$ is 32 nm that can cover the entire region of the C band. However, this case is problematic in that the thermal and mechanical stability of the polymer is degraded.

Figure 5:
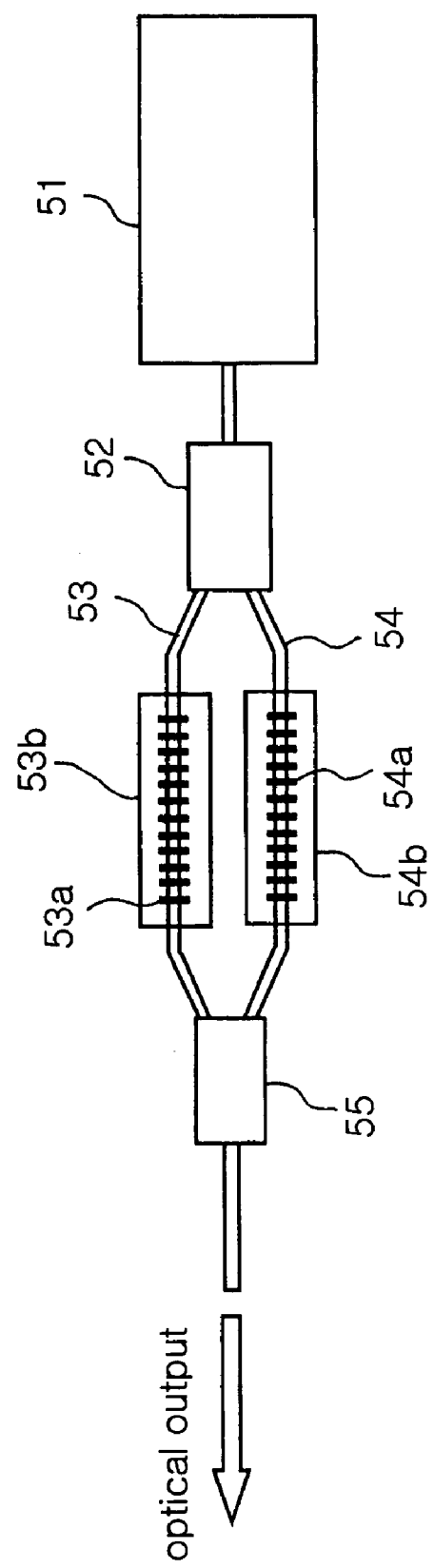
FIG. 5 is a block diagram showing the construction of a tunable wavelength optical transmission module according to a first embodiment of the present invention.
Figure 6:
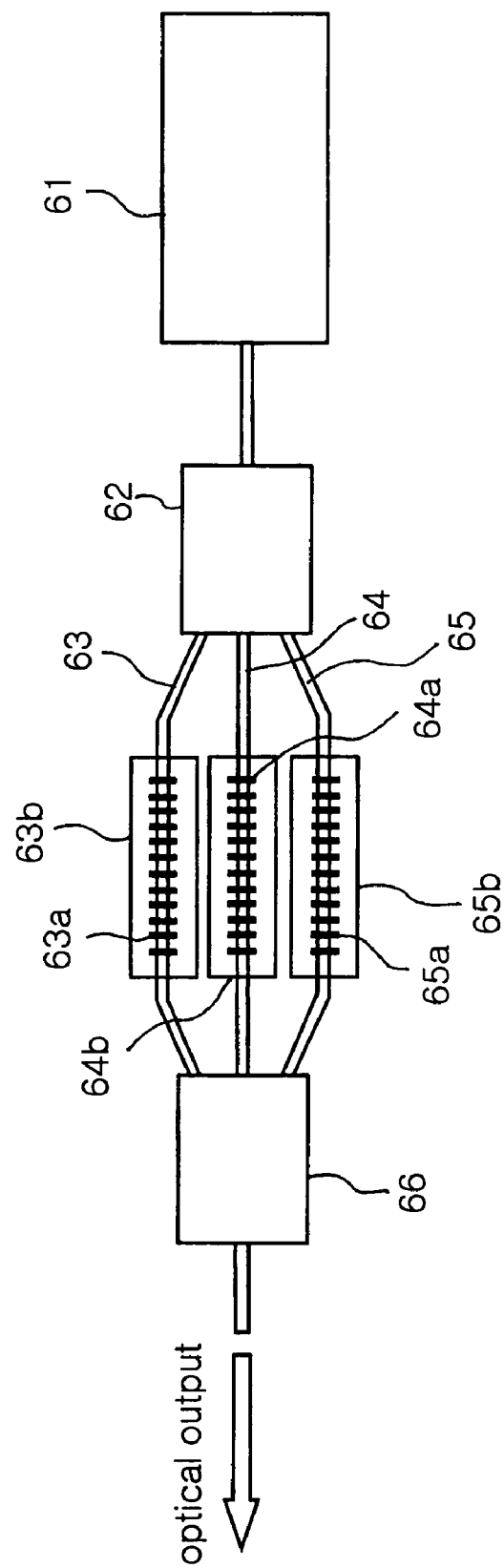
FIG. 6 is a block diagram showing the construction of another tunable wavelength optical transmission module according to the first embodiment of the present invention.

In order to allow the tunable wavelength optical transmission module according to a first embodiment of the present invention to cover the entire region of the C band while maintaining the thermal and mechanical stability of a device made of polymer, two or more Bragg gratings as shown in FIG. 3 are formed to have different grating periods and are connected in parallel to each other through an optical switch. FIGS. 5 and 6 illustrate examples of a tunable wavelength optical transmission module according to the first embodiment of the present invention, which are constructed as described above.

FIG. 5 is a block diagram showing the tunable wavelength optical transmission module having two Bragg gratings.

Referring to FIG. 5, the tunable wavelength optical transmission module includes an LD 51 for generating light in response to a predetermined electrical signal, a first optical switch 52 for multiplexing the light generated from the LD 51 and selectively providing the multiplexed light to two paths, Bragg gratings 53a and 54a placed on the two output paths of the first optical switch 52, respectively, to have different grating periods, first and second waveguides 53 and 54 made of polymer and provided with heaters 53b and 54b that are heated to a predetermined temperature in response to an external control signal and control a temperature in the vicinity of the Bragg gratings 53a and 54b, respectively, and a second optical switch 55 provided with two input terminals to be connected to the optical axes of the first and second waveguides 53 and 54, respectively, to select the optical signal of one of the first and second waveguides 53 and 54 in response to the external control signal, and to output the selected optical signal.

In the above description, the first and second waveguides 53 and 54 are planar-type waveguides made of a polymer material, and are constructed to have a structure as shown in FIG. 3. For example, a Fabry-Perot LD (FP-LD) may be used as the LD 51. The first and second optical switches 52 and 55 are also implemented to have a polymer waveguide structure that converts an optical path using the thermooptic effect. Accordingly, the first and second optical switches 52 and 55 are formed on a Planar Lightwave Circuit (PLC) platform of the first and second waveguides 53 and 54 at the same time, and the LD 51 is mounted on the corresponding PLC platform by flip-chip bonding or the like, thus reducing the size of the device.

In the above description, the center wavelengths of the Bragg gratings 53a and 54a formed in the first and second waveguides 53 and 54, respectively, and the range of variable temperatures of the heaters 53b and 54b formed in the first and second waveguides 53 and 54, respectively, are set to cover two equal sections into which a desired tunable wavelength band (for example, a C band) is divided.

Furthermore, if a desired tunable wavelength band is wider, the range of tunable wavelengths can be increased within the range of thermal/mechanical stability using 1×3 optical switches and three Bragg gratings, as shown in FIG. 6.

Referring to FIG. 6, a tunable wavelength optical transmission module includes an LD 61 for generating light in response to a predetermined electrical signal, a first optical switch 62 for multiplexing the light generated from the LD 61 and selectively providing the multiplexed light into three paths, Bragg gratings 63a, 64a and 65b placed on the two output paths of the first optical switch 62, respectively, to have different grating periods, first to third waveguides 63 to 65 made of polymer and provided with heaters 63b, 64b and 65b that are heated to predetermined temperatures in response to external control signals and control temperature in the vicinity of the Bragg gratings 63a, 64b and 65b, respectively, and a second optical switch 66 provided with three input terminals to be connected to the optical axes of the first and third waveguides 63 to 65, respectively, to select the optical signal of one of the first and third waveguides 63 and 65 in response to an external control signal, and to output the selected optical signal.

The tunable wavelength optical transmission module of FIG. 6 is identical to that of FIG. 5 except that it further includes another waveguide 65 having the Bragg grating 65a and the heater 65b. In this case, if it is assumed that the tunable wavelength optical transmission module of FIG. 6 has the same tunable wavelength band as the tunable wavelength optical transmission module of FIG. 5, the thermal and mechanical properties of the waveguides made of a polymer material can be further stabilized by setting the interval between the center wavelengths of the three Bragg gratings 63a, 64a and 65a to a narrower value and lowering the range of variable temperatures of the heaters 63b, 64b and 65b. If the interval between the center wavelengths and range of variable temperatures for the tunable wavelength optical transmission module of FIG. 6 is the same as that for the tunable wavelength optical transmission module of FIG. 5, the tunable wavelength band can be further expanded.

As described above, in accordance with the first embodiment of the present invention, two or more Bragg gratings having different grating periods are connected in parallel to each other and a desired wavelength can be selected using the optical switch, so that the thermal and mechanical stability of the waveguides made of polymer are not only achieved but the wavelength can also be tuned over a wide wavelength region at a low price. In addition, the connection of the passive waveguides with the optical fiber can be implemented in a passive alignment method in which V-grooves are formed on the waveguides and the optical fiber is inserted into the V-grooves. The manufacturing cost of the module can be reduced because the LD can be mounted on the PLC platform.

Furthermore, in the tunable wavelength optical transmission module according to the first embodiment of the present invention, the wavelength of a transmission signal can be tuned by controlling the temperatures of the heaters and the temperature of the optical switch, so that the wavelength does not need to be set at the time of manufacture but can be set manually by the user at the time of installation or automatically by the control of the OLT side. Therefore, the tunable wavelength optical transmission module can be universally used and can solve the inventory problem of products.

The tunable wavelength optical transmission module according to the present invention may be formed by connecting a plurality of Bragg gratings having different grating periods in series. In this case, the tunable wavelength optical transmission module does not need an optical switch, unlike the first embodiment. FIGS. 7 to 15 show tunable wavelength optical transmission modules in which Bragg gratings are connected in series to each other according to a second embodiment of the present invention.

Figure 7:
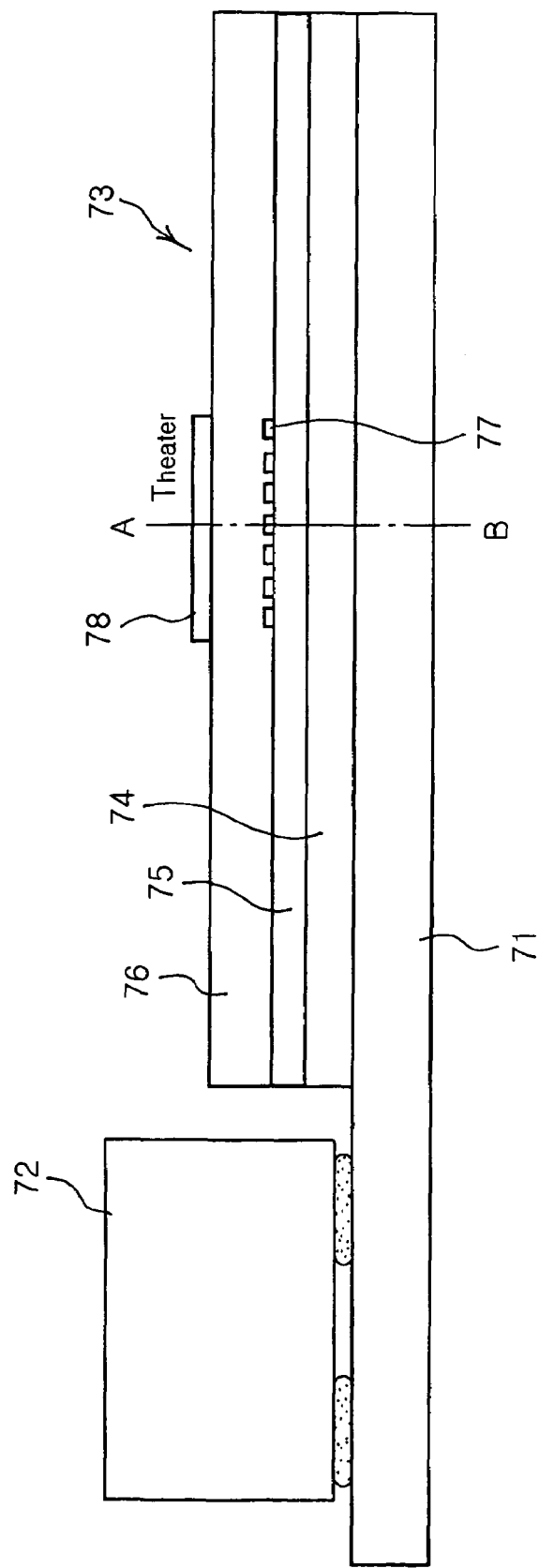
FIG. 7 is a view illustrating the principle of wavelength turning according to a second embodiment of the present invention.

FIG. 7 shows the basic structure of a tunable wavelength optical transmission module according to the second embodiment of the present invention.

Referring to FIG. 7, a waveguide 73 is formed on the substrate 71 of a PLC platform, and an LD 72 functioning as a light source is mounted on the substrate 71 so that the optical axis thereof is coincident with that of the waveguide 73. In this case, the LD 72 can be mounted by flip-chip bonding. Furthermore, the waveguide 73 includes a lower cladding layer 74, a core layer 75 formed on the lower cladding layer 74 to have a predetermined width, and an upper cladding layer 76 formed to cover the core layer 75. Bragg gratings 77 that change the line width of the core layer 75 at predetermined grating periods are formed on the core layer 75, and a heater 78 is mounted on the surface of the upper cladding layer 76 above the Bragg gratings 77.

In the above description, the waveguide 73 is made of a polymer material. The heater 78 causes local variation in temperature in the Bragg gratings 77, so that the reflection wavelength of the Bragg gratings 77 varies and, thus, an optical wavelength is controlled.

Figure 8:
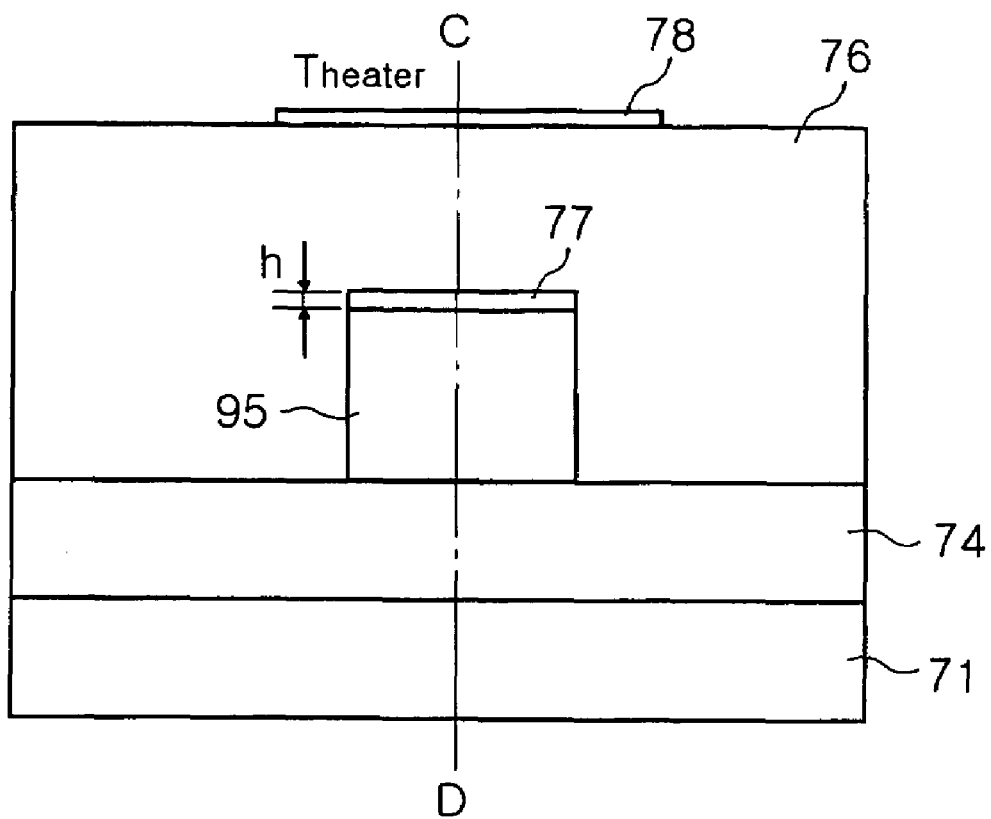
FIG. 8 is a sectional view of the tunable wavelength optical transmission module taken along line A-B of FIG. 7.

FIG. 8 is a sectional view of the tunable wavelength optical transmission module taken along line A-B of FIG. 7 that passes through the Bragg gratings 77 in a vertical direction. The Bragg gratings 77 are formed to have a thickness h on the core layer 75. In this case, the distribution of thermooptic coefficient values and refractive indices along line C-D ranging from the upper cladding layer 76 to the lower cladding layer 74 are set as shown in FIGS. 9a and 9b.

Figure 9A:
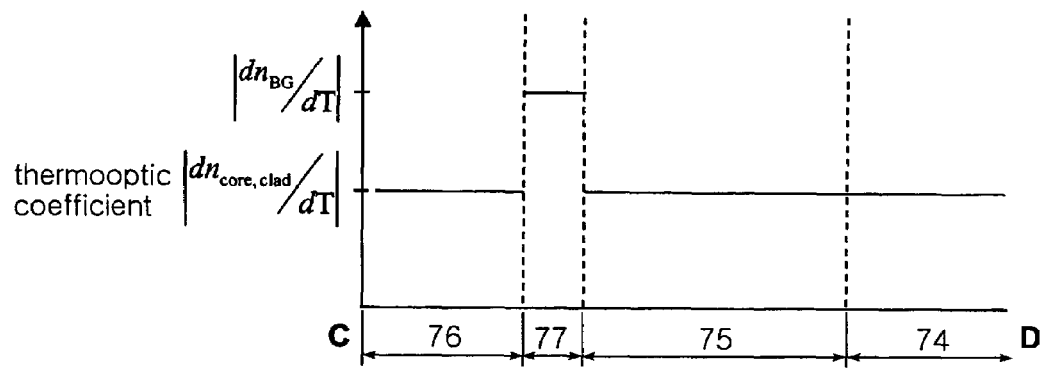
FIGS. 9a and 9b are graphs showing the distribution of thermooptic coefficients and refractive indices along lines C-D in FIG. 8.
Figure 9B:
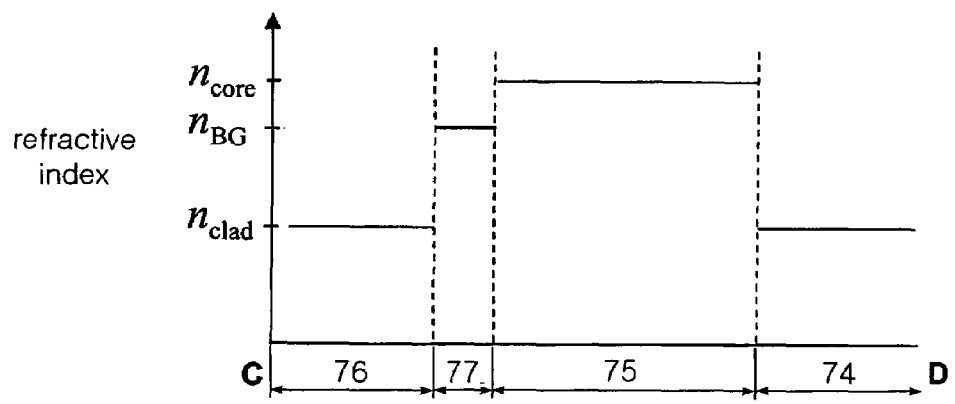

That is, as shown in FIG. 9a, the thermooptic coefficient value of the region of the Bragg gratings 77 is set to be higher than that of other regions, i.e., the upper and lower cladding layers 74 and 76 and the core layer 75. As shown in FIG. 9b, the refractive index of the Bragg gratings 77 is set to a value between those of the core layer 75 and the cladding layers 74 and 76.

If the tunable wavelength optical transmission module is implemented according to the above-described conditions, a reflection effect by the Bragg gratings 77 disappears in a specific temperature range that is set by the heater 78 and, thus, reflectance does not exist.

Figure 10:
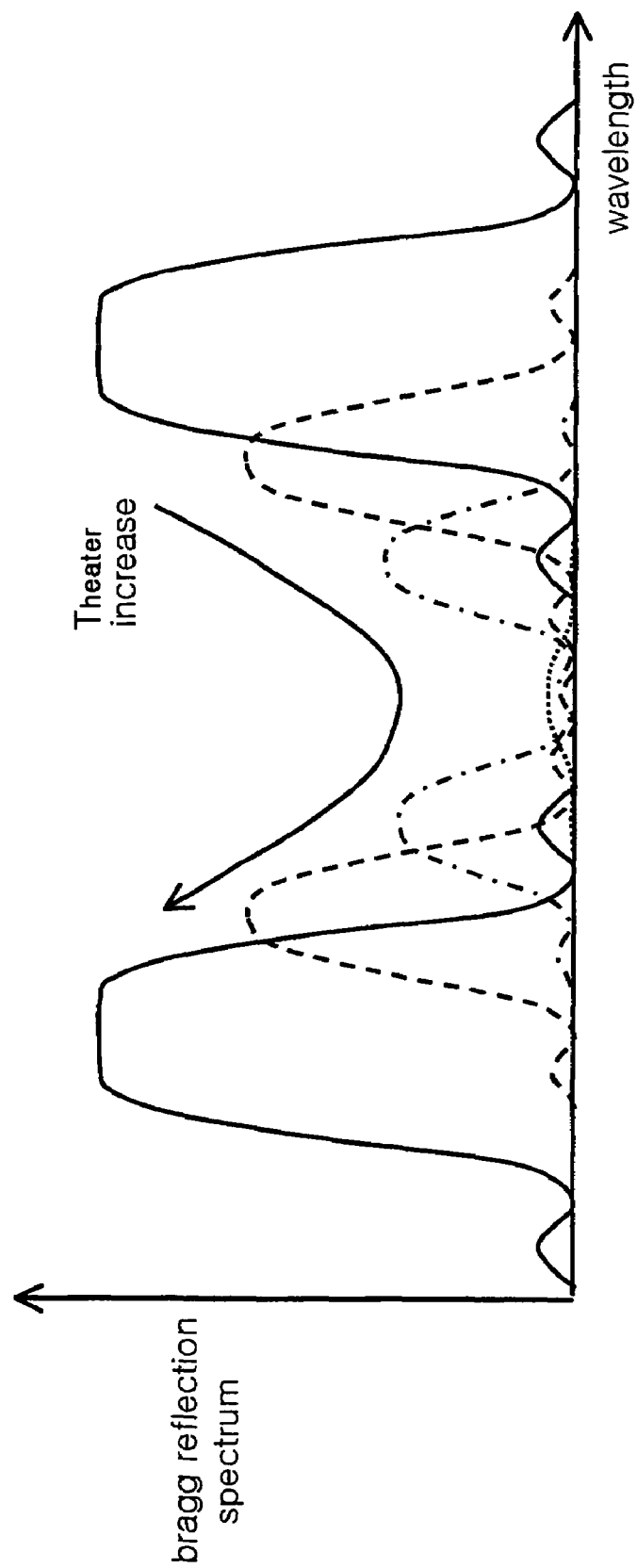
FIG. 10 is a graph showing variation in the reflection spectrum of the Bragg grating with the variation in the temperature of the heater in the structure of FIG. 7.

FIG. 10 shows the variation in reflection spectrum with respect to each wavelength in the Bragg gratings 77 with the increase in the temperature ($T_{heater}$) of the heater 78, in the structure of FIG. 7. If the temperature of the heater 78 does not increase, the refractive index of the Bragg gratings 77 is different from that of the core layer 77, so that a reflection spectrum is formed as indicated by a solid line. In this state, if the temperature of the heater 78 increases, the difference in refractive index between the Bragg gratings 77 and the core layer 75 gradually reduces, so that the reflectance gradually reduces and then becomes almost zero at a predetermined temperature. If the temperature further increases above the predetermined temperature, the difference in refractive index between the Bragg gratings 77 and the core layer 75 is generated again, and the reflectance of the Bragg gratings 77 gradually increases.

Accordingly, in order to control the reflection intensity of the Bragg gratings 77 by the local increase in temperature using the heater 78 as described above, the following equation must be fulfilled.

$$\left|\frac{dn_{BG}}{dT}\right| > \left|\frac{dn_{core,cladding}}{dT}\right|, n_{BG} > n_{cladding}, \text{ or} \quad (2)$$

$$\left|\frac{dn_{BG}}{dT}\right| < \left|\frac{dn_{core,cladding}}{dT}\right|, n_{BG} < n_{cladding}$$

In Equation 2, $$\frac{dn_{BG}}{dT}$$

is the thermooptic coefficient of Bragg gratings, $$\frac{dn_{core,cladding}}{dT}$$

is the thermooptic coefficient of the core layer and cladding layer of a waveguide, $n_{BG}$ is the refractive index of the Bragg gratings, and $n_{cladding}$ is the refractive index of the cladding layer of the waveguide.

The conditions of FIGS. 9a and 9b show an embodiment that satisfies the conditions of Equation 2. In the second embodiment of the present invention, a tunable wavelength range is increased by connecting the Bragg gratings, which satisfy the above-described conditions, in series. As a result, the range of local increase in temperature is reduced to 200° C. or less, thus improving the reliability of the entire device.

Figure 11:
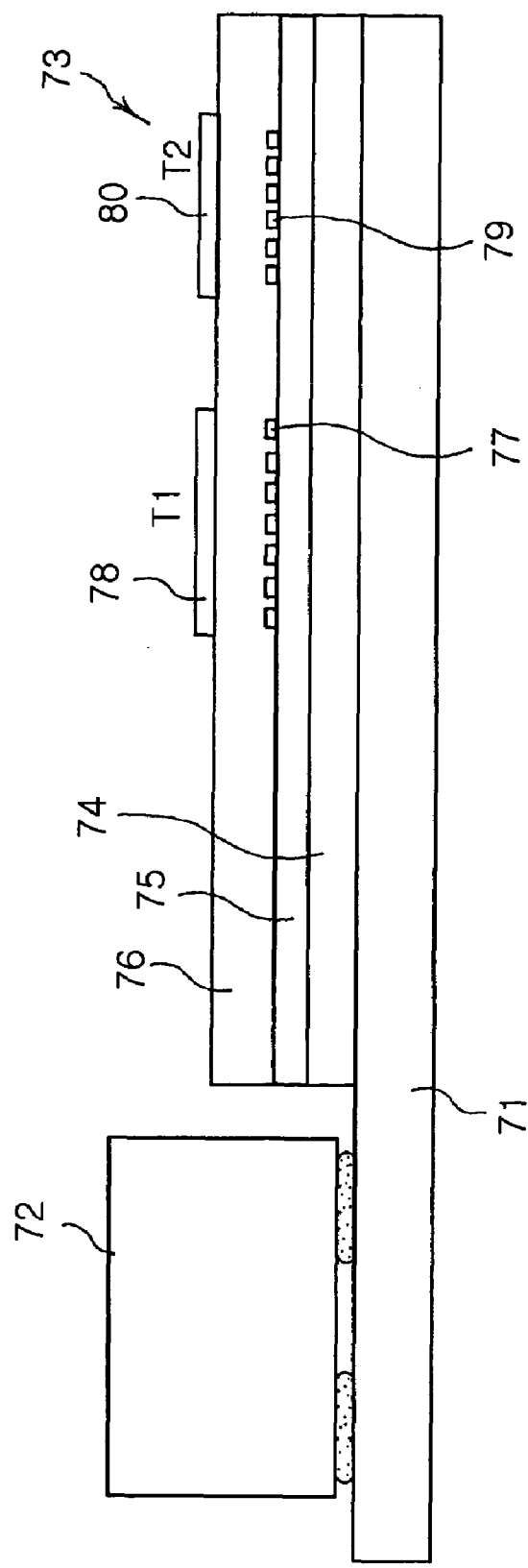
FIG. 11 is a sectional view showing the construction of a tunable wavelength optical transmission module according to a second embodiment of the present invention.
Figure 13:
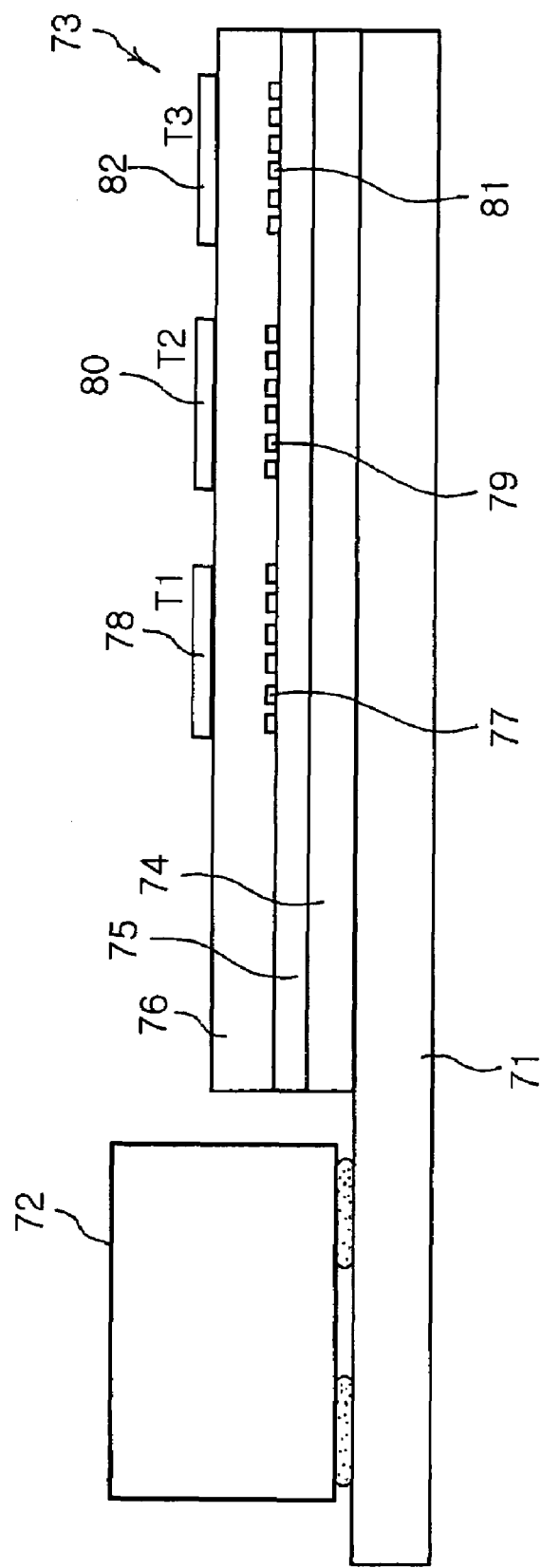
FIG. 13 is a sectional view showing another structure of the tunable wavelength optical transmission module according to the second embodiment of the present invention.

FIG. 11 is a sectional view of a tunable wavelength optical transmission module that has the same structure as that of FIG. 8 except that it has two Bragg gratings having different grating periods. FIG. 13 is a sectional view of a tunable wavelength optical transmission module that has the same structure as that of FIG. 8 except that it has three Bragg gratings having different grating periods.

Referring first to FIG. 11, in the tunable wavelength optical transmission module according to a second embodiment of the present invention, an LD 72 is mounted on a substrate 71, and a waveguide 73, which is composed of a lower cladding layer 74, a core layer 75 and an upper cladding layer 76, is formed on the substrate 71 so that the optical axis thereof is coincident with that of the LD 72. In this case, first and second Bragg gratings 77 and 79 having different grating periods are formed on the core layer 75 of the waveguide 73 to be connected in series to each other. Furthermore, first and second heaters 78 and 80 for controlling the reflection bands of the first and second Bragg gratings 77 and 79, respectively, using the thermooptic effect, are formed on the upper cladding layer 76 above the first and second Bragg gratings 77 and 79.

In the tunable wavelength optical transmission module constructed as described above, if a reflection action occurs in one of the first and second Bragg gratings 77 and 79, only an optical signal in a predetermined wavelength band is allowed to be output from the waveguide 73 by controlling the temperature of the heaters so that reflectance disappears in the other of the first and second Bragg gratings 77 and 79.

Furthermore, the first and second Bragg gratings 77 and 79 must have different grating periods, such as $\Lambda_1$ and $\Lambda_2$, and the refractive indices and thermooptic coefficients of the first and second Bragg gratings 77 and 79 must satisfy the condition of Equation 2. In this case, the variation in reflection spectrum with the variation in temperature in the waveguide 73 may be set as shown in FIG. 12.

Figure 12:
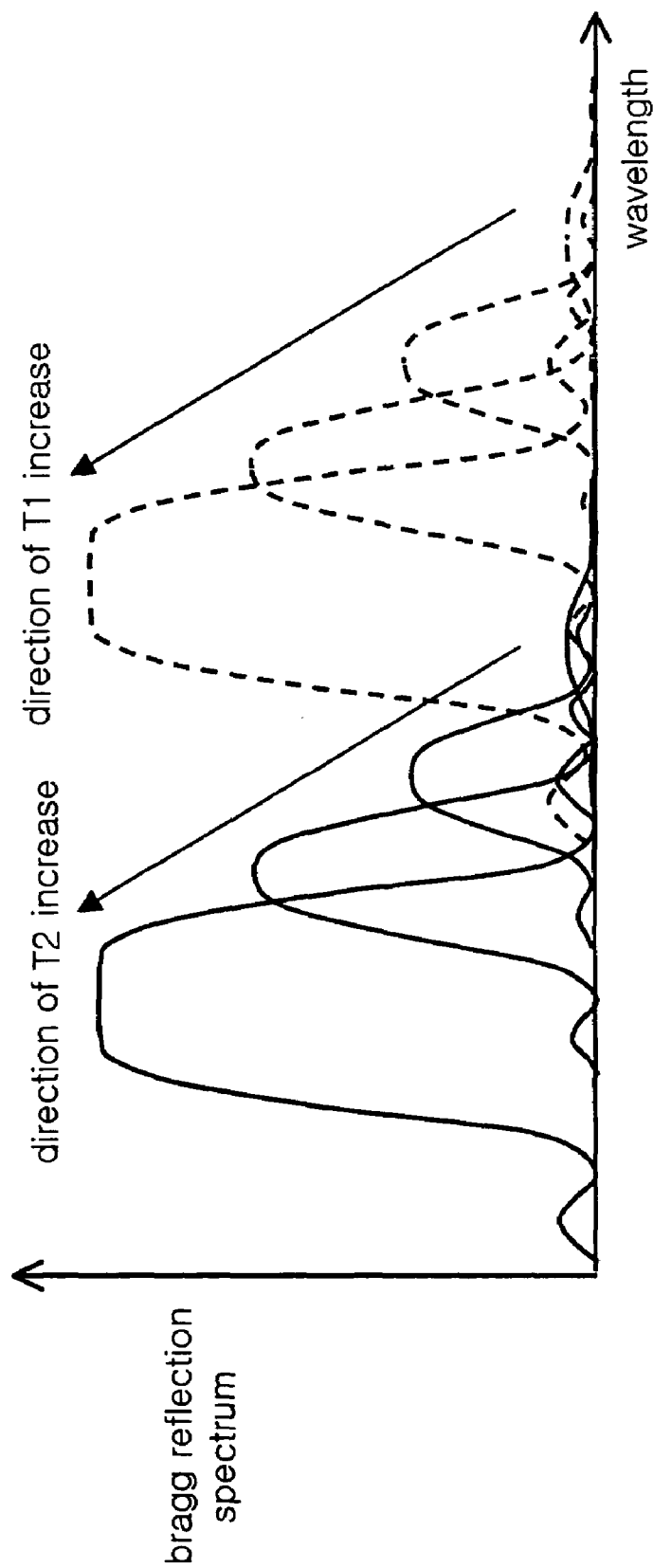
FIG. 12 is a graph showing the variation in reflection spectrum of the Bragg grating with the variation in temperature in the tunable wavelength optical transmission module of FIG. 11.

Referring to FIG. 12, the temperatures T1 and T2 of the first and second heaters 78 and 80 are initially set to temperatures at which reflection does not occur in the first and second Bragg gratings 77 and 79, and the variation in temperature is performed in such a way that a reflection band transitions to a shorter wavelength as reflectance increases.

In this case, if a desired wavelength band is desired to be set to a wavelength within the tunable wavelength range of the first Bragg grating 77, the reflection band of the first Bragg grating 77 is changed to desired wavelength band by increasing the temperature of the first heater 78 while maintaining the temperature of the second heater 80 at the initial temperature. In contrast, if a desired wavelength band corresponds to the tunable wavelength range of the second Bragg grating 79, the reflection band of the second Bragg grating 79 can be changed to a desired wavelength band by increasing the temperature of the second heater 80 while maintaining the first heater 78 at the initial temperature.

The tunable wavelength optical transmission module of FIG. 13 includes three Bragg gratings 77, 79 and 81 having different grating periods, which are connected in series to each other. The basic structure and operational principle of the tunable wavelength optical transmission module of FIG. 13 are the same as those of FIG. 11 except that the number of the Bragg gratings of FIG. 13 is greater than that of FIG. 11. Accordingly, when the tunable wavelength optical transmission module of FIG. 13 performs wavelength tuning for a band identical to that of the structure of FIG. 11, a tunable wavelength band for each of the Bragg gratings 77, 79 and 81 can be reduced and a variable temperature range for each of the heaters 78, 80 and 82 can be further lowered, so that the operational stability of the tunable wavelength optical transmission module can be further improved. In contrast, if it is assumed that the heaters 78, 80 and 82 operate only in a stable variable temperature range, the tunable wavelength band can be further expanded in proportion to the number of the Bragg gratings 77, 79 and 81.

Figure 14:
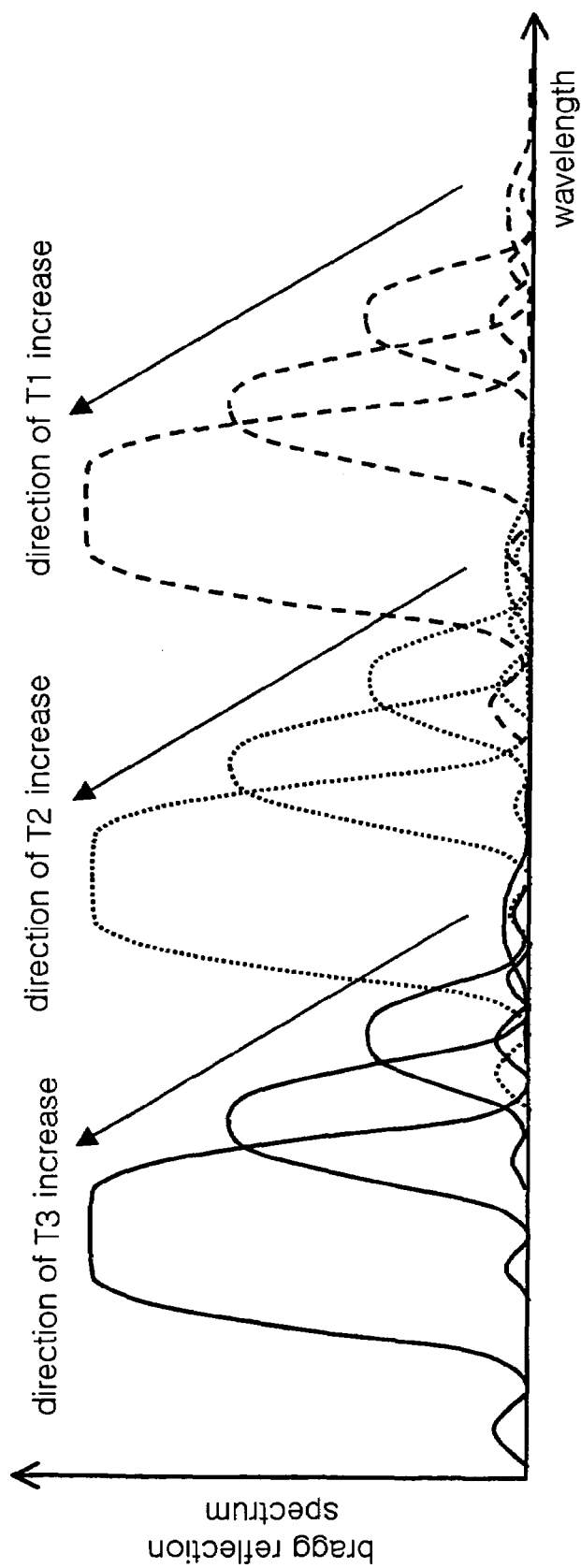
FIG. 14 is a graph showing the variation in reflection spectrums with an increase in temperature in the tunable wavelength optical transmission module shown in FIG. 13.

In the same manner as described above, in the operation of tuning the wavelength of the tunable wavelength optical transmission module of FIG. 13, the initial temperature of each of the heaters 78, 80 and 82 is set to a temperature at which the reflectance of each of corresponding Bragg gratings 77, 79 and 81 does not appear, and the variation in temperature is performed so that the reflection band of each of the Bragg gratings 77, 79 and 81 transitions to a shorter wavelength. FIG. 14 shows the variation in the reflection spectra of the Bragg gratings 77, 79 and 81 with the variation in temperatures T1, T2 and T3 of the heaters 78, 80 and 82 in the tunable wavelength optical transmission module of FIG. 13. Referring to FIG. 14, if a transmission signal is desired to be sent at a wavelength of a low band in the tunable wavelength optical transmission module of FIG. 13, the reflection band of the Bragg grating 81 is changed to a desired wavelength by increasing the temperature of the heater 82 while maintaining each of the heaters 77 and 80 at the initial temperature. In contrast, if the transmission signal is desired to be sent at a wavelength of a meddle band, the reflection band of the Bragg grating 79 is changed to a desired wavelength by increasing the temperature of the heater 80 above the initial temperature while maintaining each of the heaters 78 and 82 at the initial temperature. If the transmission signal is desired to be sent at a wavelength in a high band, the reflection band of the Bragg grating 78 is changed to a desired wavelength by increasing the temperature of the heater 78 while maintaining each of the heaters 80 and 82 at the initial temperature.

As described above, in the second embodiment of the present invention, the construction of the device is simplified by eliminating the optical switch.

Figure 15:
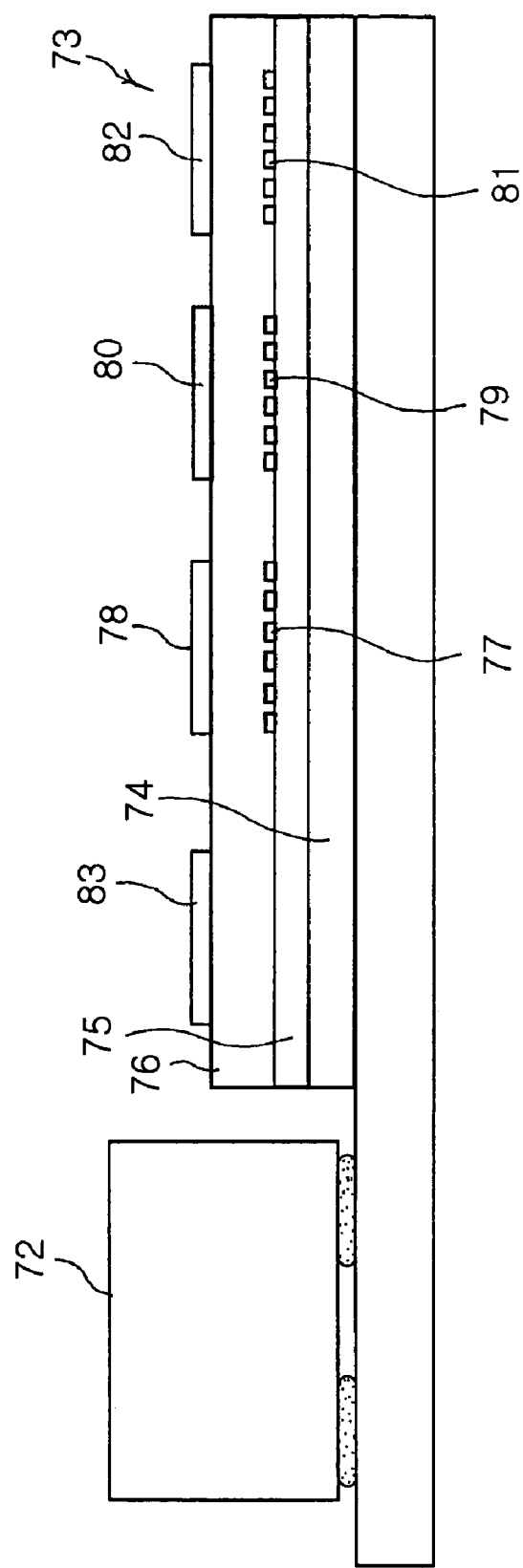
FIG. 15 is a diagram showing the construction of a tunable wavelength optical transmission module having a phase adjustment means according to the second embodiment of the present invention.

Furthermore, the tunable wavelength optical transmission module according to the present invention may further include a phase adjustment means 83 to finely control an oscillating wavelength, as shown in FIG. 15. The phase adjustment means 83 can be implemented as a heater that is provided on the waveguide 73 in a region where the Bragg gratings 77, 79 and 81 are not formed. The phase adjustment means 83 changes an oscillating mode condition caused by the thermooptic effect through the local variation in the temperature of the waveguide 73. The phase adjustment means 83 can be applied even to the tunable wavelength optical transmission module of FIG. 11 that has the two Bragg gratings, in the same manner.

In the tunable wavelength optical transmission module according to the third embodiment of the present invention, the waveguide can be made of silica having a low thermooptic coefficient, and the Bragg gratings can be made of a SiN material having a thermooptic coefficient that is much lower than that of polymer. Therefore, the variable temperature range can be reduced 10 times or more, and thermal and mechanical stability in the operation of the device can be increased accordingly, compared to the second embodiment.

Figure 16A:
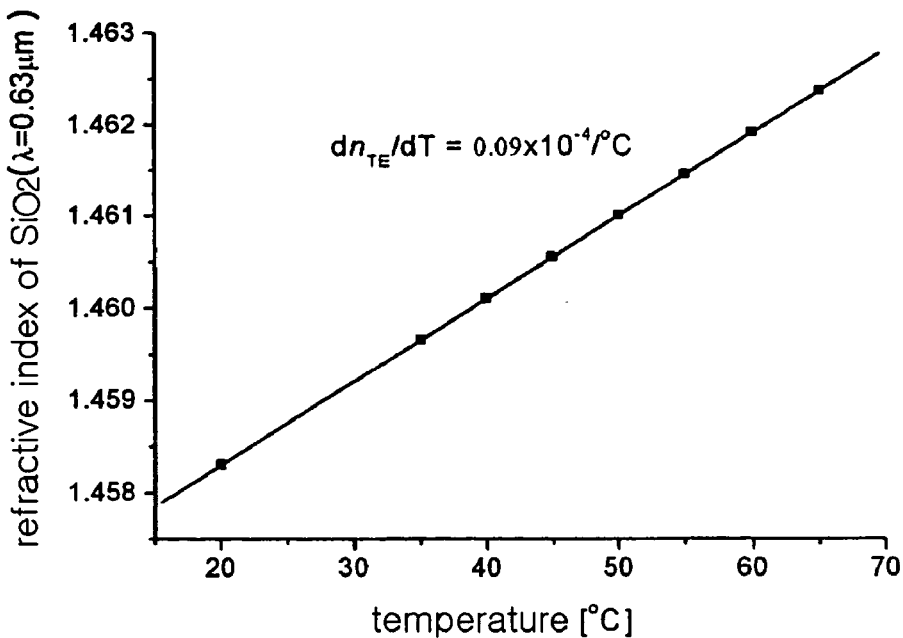
FIG. 16a is a graph showing the variation in the refractive index of $SiO_2$ with the variation in temperature and thermooptic coefficient.
Figure 16B:
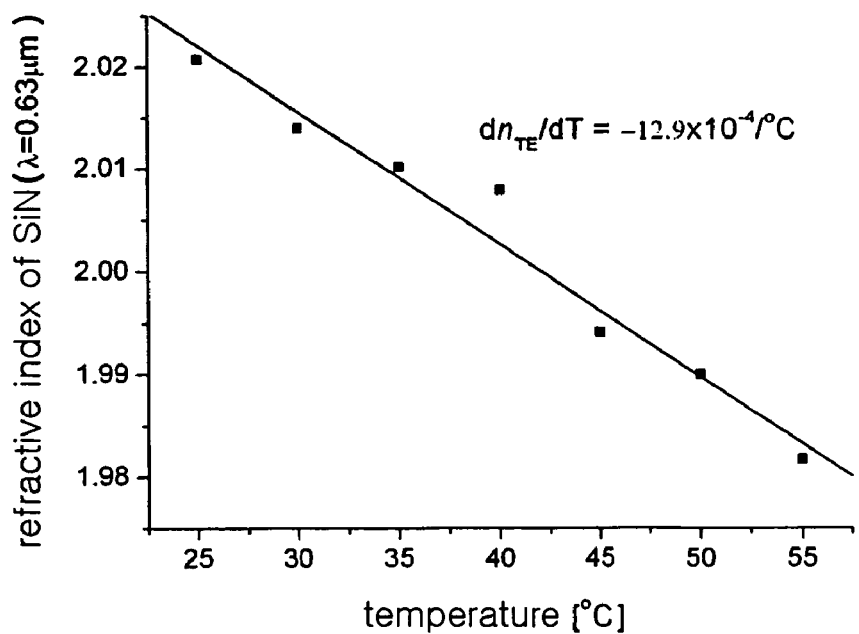
FIG. 16b is a graph showing the variation in the refractive index of SiN with the variation in temperature and thermooptic coefficient.

FIG. 16a shows the variation in the refractive index of silica ($SiO_2$) with the variation in temperature. FIG. 16b shows the variation in the refractive index of SiN with the variation in temperature. As shown in FIGS. 16a and 16b, the thermooptic coefficient of silica is very low, i.e., about $-0.09 \times 10^{-4}$/K, and the thermooptic coefficient of SiN is about $-12.9 \times 10^{-4}$/K that corresponds to about 10 times that of the polymer. Accordingly, if the waveguide itself is made of silicon having high thermal stability and the Bragg gratings are made of SiN having a high thermooptic coefficient, the stability of a device is increased and the wavelength tuning sensitivity versus temperature can be improved.

FIGS. 17a to 23b show various examples of a tunable wavelength optical transmission module according to a third embodiment of the present invention.

FIGS. 17a and 17b are sectional and top views of the tunable wavelength optical transmission module according to the third embodiment of the present invention, respectively. Referring to FIGS. 17a and 17b, the tunable wavelength optical transmission module includes a substrate 71, an LD 72 mounted on the substrate 71 to emit light in a lateral direction, a first waveguide 91 formed on the substrate 71 and sequentially composed of a lower cladding layer 92, a core layer 93 and an upper cladding layer 94 to be optically coupled to the LD 72, a second waveguide 95 made of SiN, formed at a predetermined height above the core layer 93 of the first waveguide 91 and provided with a Bragg grating 96 and coupling regions 97 and 98, and a heater 99 provided on the surface of the first waveguide 91 above the Bragg grating 96.

The Bragg grating 96 may be formed by arranging two or more Bragg gratings having different grating periods in series along the optical path.

That is, the second waveguide 95 made of SiN having a high thermooptic coefficient is formed within the first waveguide 91 made of $SiO_2$ to have a predetermined length, and the Bragg grating 96 is formed on the second waveguide 95. The first waveguide 91 is made of $SiO_2$ to achieve efficient optical coupling to the LD 72. In this case, to achieve efficient optical exchange between the first waveguide 91 made of $SiO_2$ and the second waveguide 95 made of SiN, which have different refractive indices, coupling regions 97 and 98 the line widths of which are tapered are formed on the second waveguide 95 at the front and rear ends of the Bragg grating 96, respectively. The length of the coupling regions 97 and 98 is set to a distance Lc. The location variation in temperature in the vicinity of the Bragg grating 96, which is formed on the second waveguide 95, can be performed by the heater 99 that is located above the Bragg grating 96.

Figure 18:
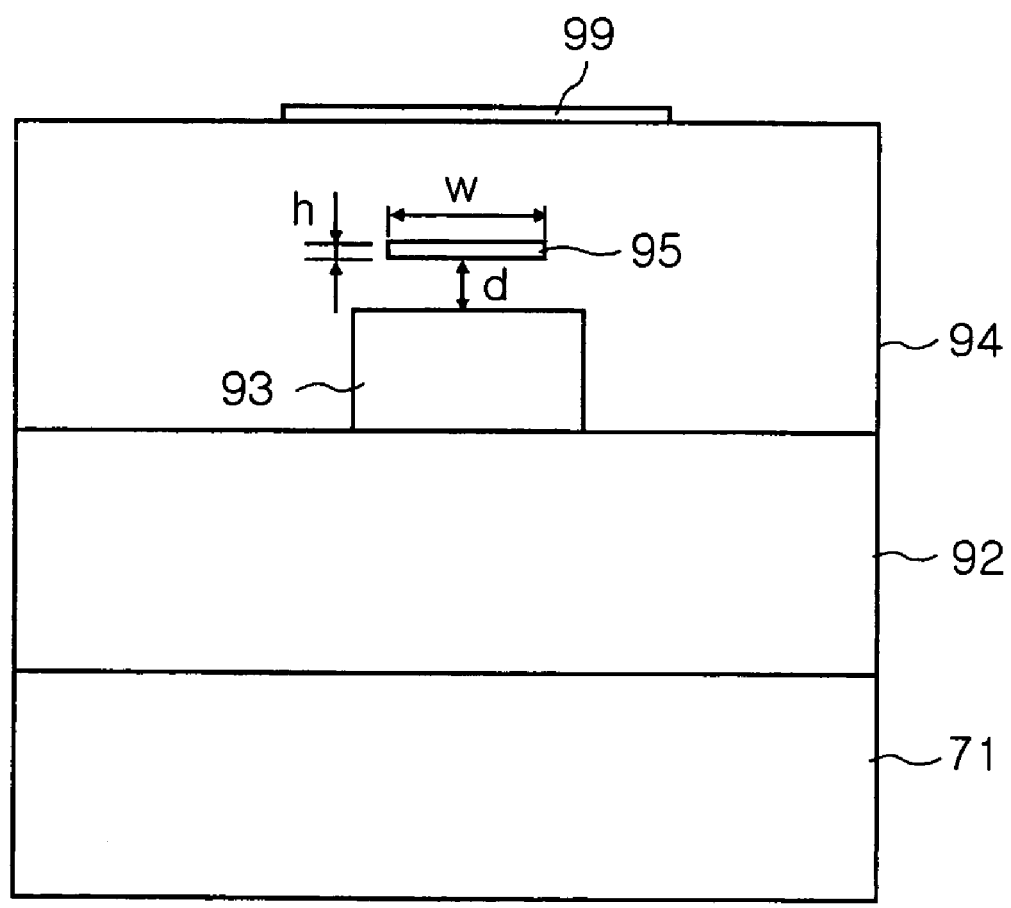
FIG. 18 is a sectional view of the tunable wavelength optical transmission module taken along line A-B of FIGS. 17a and 17b.

FIG. 18 is a sectional view of the tunable wavelength optical transmission module taken along dotted lines A-B of FIGS. 17a and 17b.

Referring to FIG. 18, in the channel waveguide-shaped first waveguide 91 in which the lower cladding layer 92, the core layer 93 and the upper cladding layer 94 are sequentially formed on the substrate 71, the second waveguide 95 is formed to have a width w and a thickness h within the upper cladding layer 94 that is spaced apart from the core 93 by a distance d. The coupling regions 97 and 98, which has the distance Lc and the line widths of which are tapered toward the ends thereof are formed at both ends of the second waveguide 95 through which light is input and output to and from the second waveguide 95.

The coupling regions 97 and 98 are adapted to optically couple light from the first waveguide 91 to the second waveguide 95 and light from the second waveguide 95 to the first waveguide 91. In this case, light, which is not coupled to the second waveguide 95 made of SiN in the coupling region 97 but is transmitted to the first waveguide 91 made of $SiO_2$, is not reflected by the Bragg grating 96 and can interfere with light passing through the second waveguide 95 in the coupling region 98. Accordingly, it is preferable to provide a coupling efficiency of 90% or more in the coupling regions 97 and 98.

In the tunable wavelength optical transmission module, light generated from the LD 72 is incident on the first waveguide 91, and is then coupled to the second waveguide 95 through the coupling region 97 while being transmitted along the first waveguide 91. The light is then reflected by the Bragg grating 96 of the second waveguide 95 and only an optical signal in a predetermined wavelength band is transmitted to the first waveguide 91 through the coupling region 98. Accordingly, a wavelength tuning action is performed within the second waveguide 95 and the second waveguide 95 is made of SiN having a high thermooptic coefficient, so that wavelength tuning can be achieved through low temperature variation in inverse proportion to the thermooptic coefficient.

Meanwhile, in the tunable wavelength optical transmission module, optical interference is caused by an optical signal that is not coupled from the first waveguide 91 to the second waveguide 95, so that the coupling region may be provided only at the entrance of the second waveguide 95.

FIGS. 19a and 19b shows the construction of a tunable wavelength optical transmission module in which a coupling region 97 is formed only at the front end of a Bragg grating 96 in a second waveguide 95'. In this case, light that is transmitted through the Bragg grating 96 constitutes an optical loss. The reflectance of the Bragg grating 96 is preferably 90% or more to reduce such an optical loss.

Furthermore, to prevent such optical interference, a tunable wavelength optical transmission module shown in FIGS. 20a and 20b is provided, and the structure of the tunable wavelength optical transmission module is the same as that of FIGS. 17a and 17b except that some portion of the core layer 93' of a first waveguide 91', which is located below a Bragg grating 96, is eliminated.

In the tunable wavelength optical transmission module of FIGS. 20a and 20b, light, which is generated from the LD 72 and is then incident on the core layer 93' of the first waveguide 91', is coupled to the second waveguide 95 of SiN through the coupling region 97 that is located at the front end of the second waveguide 95. Although a part of the light is transmitted through the first waveguide 91', it is not transmitted to the rear end of the second waveguide 95 because the core layer 93' of the first waveguide 91' is cut. Accordingly, after being coupled to the second waveguide 95, the light, the wavelength of which is tuned by the interaction between the Bragg grating 96 and the heater 99, is coupled to the rear end of the first waveguide 91' through the coupling region 98.

With the above-described construction, the interference between light, which is not coupled to the second waveguide 95, and light, which is coupled from the second waveguide to the first waveguide 91', can be prevented. However, in the above description, light, which is not coupled from the first waveguide 91' to the second waveguide 95 but is transmitted through the first waveguide 91', constitutes an optical loss in the tunable wavelength optical transmission module. In order to reduce such an optical loss, coupling efficiency in the coupling regions 97 and 98 is preferably 90% or more.

Figure 22:
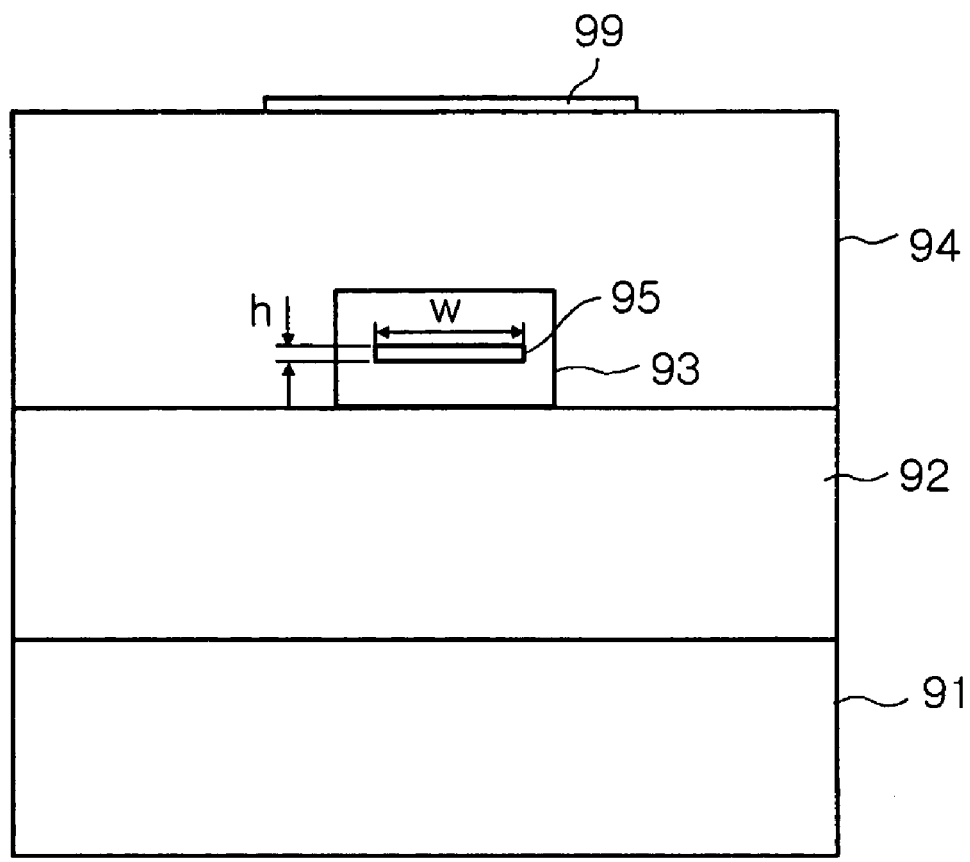
FIG. 22 is a sectional view of the tunable wavelength optical transmission module taken along line A-B of FIG. 21.

FIGS. 21a and 21b are sectional and top views of a tunable wavelength optical transmission module according to a third embodiment of the present invention, respectively. In this embodiment, the tunable wavelength optical transmission module has the same structure as that of FIGS. 17a and 17b except that a second waveguide 95 provided with a Bragg grating 96 and made of SiN is formed within the core layer 93 of a first waveguide 91 made of SiO$_2$. FIG. 22 is a longitudinal section of the tunable wavelength optical transmission module taken along line A-B of FIGS. 21a and 21b. Referring to FIGS. 21a, 21b and 22, an LD 72 is mounted on a substrate 71 by flip-chip bonding so that the direction of optical output is directed toward the side thereof. The first waveguide 91 that is sequentially composed of a lower cladding layer 92, the core layer 93 and an upper cladding layer 94 is formed on the substrate 71 so that the first waveguide 91 is aligned with the direction of optical output to achieve optical coupling. In this case, the second waveguide 95, which is made of SiN and has a thickness h and a width w, is formed within the core layer 93, and the Bragg grating 96 is formed on the second waveguide 95. Furthermore, to increase the optical coupling efficiency between the first waveguide 91 and the second waveguide 95, the second waveguide 95 has coupling regions 97 and 98 line widths of which are tapered toward the ends thereof.

If the second waveguide 95 is formed within the core layer 93 of the first waveguide 91 as shown in FIGS. 21a and 21b, the tunable wavelength optical transmission module has an optical coupling efficiency similar to that of the structures shown in FIGS. 17a, 17b, 19a, 19b, 20a and 20b, is superior in terms of a signal loss and does not cause optical interference. However, the module is disadvantageous in that fabrication is complicated because the core layer 93 should be formed through two deposition processes.

In the third embodiment, wavelength tuning is performed in the same manner as in the tunable wavelength optical transmission module according to the second embodiment of the present invention. That is, a refractive index and a reflection band in the Bragg grating 96 are controlled by increasing the temperature of the heater 99 while maintaining the initial temperature of the heater 99 in a temperature range where reflectance is minimal in the Bragg grating 96.

The tunable wavelength optical transmission module according to the third embodiment of the present invention may further include a phase adjustment means to finely control a wavelength in the same manner as the second embodiment of FIG. 15.

FIGS. 23a and 23b are sectional and top views of a tunable wavelength optical transmission module having a phase adjustment means according to a third embodiment of the present invention. Referring to FIGS. 23a and 23b, the phase adjustment means 100, which controls a wavelength using a thermooptic effect, is provided on a first waveguide 91 between an LD 92 and a second waveguide 95. The phase adjustment means 100 can be applied to the tunable wavelength optical transmission modules of FIGS. 19a to 21b as well as FIGS. 17a and 17b.

Furthermore, in the tunable wavelength transmission module according to the present invention, a V-groove can be on a waveguide to achieve coupling to an optical fiber. Therefore, the optical fiber can be coupled by a manual alignment method.

FIGS. 24a and 24b are sectional and top views of a tunable wavelength optical transmission module having a V-groove according to the present invention.

The V-groove 84 is formed at the end of the waveguide 73 of the tunable wavelength optical transmission module made of the polymer material according to the second embodiment of the present invention so that the optical axis thereof can be coincident with that of the optical fiber. An optical fiber 85 is inserted into the V-groove 84. The above-described structure can be also applied to the tunable wavelength optical transmission modules made of silica and SiN according to the first embodiment of the present invention shown in FIGS. 5 and 6.

Therefore, the tunable wavelength optical transmission module according to the present invention can be coupled to the optical fiber by a manual alignment method.

As described above, according to the present invention, a tunable wavelength optical transmission module the wavelength of which can be tuned over a wide region of a C-band can be implemented at a low price. Since the wavelength can be tuned using a thermooptic effect, the transmission wavelength of the optical transmission module can be set at the time of installation rather than the time of fabrication. Accordingly, the present invention is advantageous in that it can reduce the occurrence of the inventory problem of the devices. Furthermore, the wavelength can be tuned over the entire range of the C band within the stable temperature range of a device, so that the mechanical and thermal stability of the device can be increased.

In particular, according to the third embodiment of the present invention, the Bragg grating can be made of SiN having a high thermooptic coefficient, so that wavelength tuning is performed in a lower temperature range and, thus, power consumption can be reduced.

Furthermore, the tunable wavelength optical transmission module according to the present invention can be mass-produced at a low price, so that a tunable wavelength optical transmission module that is suitable for an ONT that requires a low price can be provided.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A tunable wavelength optical transmission module, comprising:
   a laser diode for generating light and outputting the light in a predetermined direction;
   a first optical switch for selectively providing an optical signal output from the laser diode to a plurality of optical paths;
   a plurality of planar-type waveguides coupled to the plurality of the output paths of the first optical switch, respectively;
   a plurality of Bragg gratings having different grating periods to tune a wavelength of the optical signal that passes through a corresponding planar-type waveguide, the Bragg gratings being formed on the planar-type waveguides, respectively, to be connected in parallel to each other;
   a plurality of heaters respectively formed on the plurality of the planar-type waveguides at locations opposite to those of the Bragg gratings to control reflectance and reflection bands of the Bragg gratings using a thermooptic effect, respectively;
   a second optical switch for selecting and outputting one of a plurality of optical signals that have their wavelengths tuned through the plurality of the planar-type waveguides, and phase adjustment means for finely controlling the wavelength by changing a mode condition of the waveguide using a thermooptic effect.

2. The tunable wavelength optical transmission module as set forth in claim 1, wherein the first and second optical switches are optical waveguide type switches.

3. A tunable wavelength optical transmission module, comprising:
a laser diode for generating light and outputting the light in a predetermined direction;
a planar-type waveguide on which the light output from the laser diode is incident;
a plurality of Bragg gratings having different grating periods to tune a wavelength of the optical signal that passes through a corresponding planar-type waveguide, the Bragg gratings being formed on the planar-type waveguides, respectively, to be connected in series to each other;
a plurality of heaters respectively formed on the plurality of the planar-type waveguides above the Bragg gratings to control reflectance and reflection bands of the Bragg gratings using a thermooptic effect, respectively, and
phase adjustment means for finely controlling the wavelength by changing a mode condition of the waveguide using a thermooptic effect.

4. The tunable wavelength optical transmission module as set forth in claim 1 or 3, wherein the planar-type waveguides are made of polymer.

5. The tunable wavelength optical transmission module as set forth in claim 1 or 3, wherein the Bragg gratings have thermooptic coefficients and refractive indices that satisfy the following equation, $$\left|\frac{dn_{BG}}{dT}\right| > \left|\frac{dn_{core,cladding}}{dT}\right|, n_{BG} > n_{cladding}, \text{ or}$$

$$\left|\frac{dn_{BG}}{dT}\right| < \left|\frac{dn_{core,cladding}}{dT}\right|, n_{BG} < n_{cladding}$$

where $$\frac{dn_{BG}}{dT}$$

is the thermooptic coefficient of the Bragg gratings, $$\frac{dn_{core,cladding}}{dT}$$

is the thermooptic coefficient of the core layer and cladding layer of the waveguide, $n_{BG}$ is the refractive index of the Bragg gratings, and $n_{cladding}$ is the refractive index of the cladding layer of the waveguide.

6. The tunable wavelength optical transmission module as set forth in claim 1 or 3, wherein the planar-type waveguide is a channel waveguide that includes a lower cladding layer, a core layer formed on the lower cladding layer to have a predetermined width, and an upper cladding layer adapted to cover a top of the core layer.

7. A tunable wavelength optical transmission module, comprising:
a laser diode for generating light and outputting the light in a predetermined direction;
a first waveguide on which the light output from the laser diode is incident and which is made of $SiO_2$;
a second waveguide made of SiN and formed within the first waveguide;
a plurality of Bragg gratings having different grating periods to tune wavelengths of optical signals, the Bragg grating being formed on the second waveguide to be connected in series to each other; and
a plurality of heaters formed on the first waveguide at locations opposite to those of the Bragg gratings, respectively, to turn operational wavelengths of the Bragg gratings using a thermooptic effect,
and the said tunable wavelength optical transmission module can be constructed as a single module.

8. The tunable wavelength optical transmission module as set forth in claim 7, wherein the second waveguide includes coupling regions, line widths of which are tapered at both ends thereof so that optical coupling to the first waveguide is achieved.

9. The tunable wavelength optical transmission module as set forth in claim 7, wherein the second waveguide includes a coupling region, a line width of which is tapered, at a front end thereof on which the light is incident from the first waveguide.

10. The tunable wavelength optical transmission module as set forth in claim 7, wherein a predetermined portion of the first waveguide located below the second waveguide is removed to prevent transmission of the light through the first waveguide.

11. The tunable wavelength optical transmission module as set forth in claim 7, wherein the first waveguide is a channel waveguide that comprises a lower cladding layer, a core layer formed on the lower cladding layer to have a predetermined width, and an upper cladding layer adapted to cover a top of the core layer.

12. The tunable wavelength optical transmission module as set forth in claim 11, wherein the second waveguide is located within the upper cladding layer at a predetermined height above the core layer of the first waveguide.

13. The tunable wavelength optical transmission module as set forth in claim 11, wherein the second waveguide is located within the core layer of the first waveguide.

14. The tunable wavelength optical transmission module as set forth in claim 7, further comprising phase adjustment means for finely controlling the wavelength by changing a mode condition of the waveguide using a thermooptic effect.

15. The tunable wavelength optical transmission module as set forth in any one of claims 1, 3 and 7, wherein a V-groove is formed at an end of the waveguide, from which the light is output, to couple the module to an optical fiber.

16. The tunable wavelength optical transmission module as set forth in any one of claims 1, 3 and 7, wherein the plurality of the heaters selectively increase and decrease operational temperatures according to a desired optical wavelength based on a temperature at which reflectance of the Bragg gratings becomes minimal.

* * * * *